(12) United States Patent
Radovich et al.

(10) Patent No.: US 12,176,495 B2
(45) Date of Patent: *Dec. 24, 2024

(54) BATTERY PACK SWITCH

(71) Applicant: MILWAUKEE ELECTRIC TOOL CORPORATION, Brookfield, WI (US)

(72) Inventors: Kyle J. Radovich, West Bend, WI (US); Cameron R. Schulz, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/190,139

(22) Filed: Mar. 2, 2021

(65) Prior Publication Data

US 2021/0184271 A1 Jun. 17, 2021

Related U.S. Application Data

(63) Continuation of application No. 15/845,068, filed on Dec. 18, 2017, now Pat. No. 10,944,131.

(Continued)

(51) Int. Cl.
*H01M 10/42* (2006.01)
*B25F 5/02* (2006.01)
(Continued)

(52) U.S. Cl.
CPC ............. *H01M 10/425* (2013.01); *B25F 5/02* (2013.01); *H01M 10/0525* (2013.01);
(Continued)

(58) Field of Classification Search
None
See application file for complete search history.

(56) References Cited

U.S. PATENT DOCUMENTS

| 3,952,239 A | 4/1976 | Owings et al. |
| 5,238,083 A | 8/1993 | Horie et al. |

(Continued)

FOREIGN PATENT DOCUMENTS

| AU | 2009268165 A1 | 1/2010 |
| CN | 203506135 U | 4/2014 |

(Continued)

OTHER PUBLICATIONS

International Search Report and Written Opinion for Application No. PCT/US2017/066972 dated Apr. 16, 2018, 15 pages.

(Continued)

*Primary Examiner* — Jonathan Crepeau
(74) *Attorney, Agent, or Firm* — Michael Best & Friedrich LLP

(57) ABSTRACT

A battery pack including a housing defining an aperture, a first battery cell within the housing, a second battery cell within the housing, and a switch. The first battery cell is electrically connected to a first terminal. The second battery cell is electrically connected to a second terminal. The switch is configured to be in a first position and a second position. The switch includes a user-interface, that may extend through the aperture, and a plate, located within the housing. The plate includes a conductive portion and a non-conductive portion. The conductive portion is configured to electrically connect the first terminal to the second terminal when the switch is in the first position. The non-conductive portion is configured to galvanically isolate the first terminal from the second terminal when the switch is in the second position.

16 Claims, 34 Drawing Sheets

Related U.S. Application Data

(60) Provisional application No. 62/435,453, filed on Dec. 16, 2016.

(51) Int. Cl.
  *H01M 10/0525* (2010.01)
  *H01M 10/6235* (2014.01)
  *H01M 50/20* (2021.01)
  *H01M 50/209* (2021.01)
  *H01M 50/213* (2021.01)
  *H01M 50/502* (2021.01)
  *H01M 50/553* (2021.01)

(52) U.S. Cl.
  CPC ....... *H01M 10/6235* (2015.04); *H01M 50/20* (2021.01); *H01M 50/209* (2021.01); *H01M 50/213* (2021.01); *H01M 50/502* (2021.01); *H01M 50/553* (2021.01); *H01M 2220/30* (2013.01); *Y02E 60/10* (2013.01)

(56) References Cited

U.S. PATENT DOCUMENTS

| | | | |
|---|---|---|---|
| 5,534,788 A | 7/1996 | Smith et al. | |
| 5,553,675 A | 9/1996 | Pitzen et al. | |
| 5,578,391 A | 11/1996 | Meyers et al. | |
| 5,762,512 A | 6/1998 | Trant et al. | |
| 5,973,476 A | 10/1999 | Irvin | |
| 6,225,153 B1 | 5/2001 | Neblett et al. | |
| 6,225,708 B1 | 5/2001 | Furukawa et al. | |
| 6,365,297 B1 | 4/2002 | Wolczak et al. | |
| 6,741,065 B1 | 5/2004 | Ishii et al. | |
| D535,250 S | 1/2007 | Watson | |
| 7,161,326 B2 | 1/2007 | Kubota et al. | |
| 7,323,846 B2 | 1/2008 | Santana, Jr. | |
| 7,397,219 B2 | 7/2008 | Phillips et al. | |
| 7,411,326 B2 | 8/2008 | Achor et al. | |
| 7,443,134 B2 | 10/2008 | Phillips et al. | |
| 7,463,007 B2 | 12/2008 | Phillips et al. | |
| 7,486,047 B2 | 2/2009 | Phillips et al. | |
| 7,489,108 B2 | 2/2009 | Matsumoto et al. | |
| D597,931 S | 8/2009 | Aglassinger | |
| 7,598,705 B2 | 10/2009 | Watson et al. | |
| 7,701,172 B2 | 4/2010 | Watson et al. | |
| 7,767,335 B2 | 8/2010 | Sharrow et al. | |
| D633,036 S | 2/2011 | Murray | |
| D640,196 S | 6/2011 | Shuang et al. | |
| 8,054,047 B2 | 11/2011 | Chen et al. | |
| 8,337,237 B2 | 12/2012 | Masuda et al. | |
| 8,368,283 B2 | 2/2013 | Kim et al. | |
| D679,651 S | 4/2013 | Stratford | |
| D680,064 S | 4/2013 | Tirone et al. | |
| 8,450,975 B2 | 5/2013 | Kim | |
| D687,380 S | 8/2013 | Tirone et al. | |
| 8,564,245 B2 | 10/2013 | Bosch et al. | |
| D699,180 S | 2/2014 | Sweere et al. | |
| 8,752,645 B2 | 6/2014 | Liebhard | |
| 8,766,599 B2 | 7/2014 | Kim | |
| 8,852,775 B2 | 10/2014 | McGuire et al. | |
| 9,197,146 B2 | 11/2015 | Mergener et al. | |
| 9,444,082 B2 | 9/2016 | Tsujimura et al. | |
| D780,688 S | 3/2017 | Elder | |
| 9,786,877 B2 | 10/2017 | Umemura et al. | |
| D812,555 S | 3/2018 | Schoch | |
| 9,923,249 B2 | 3/2018 | Rejman et al. | |
| 9,931,707 B2 | 4/2018 | Balaster | |
| D826,150 S | 8/2018 | Cayon | |
| D841,572 S | 2/2019 | Gilpatrick et al. | |
| D844,556 S | 4/2019 | Irfan et al. | |
| D844,558 S | 4/2019 | Taniguchi et al. | |
| 10,944,131 B2 * | 3/2021 | Radovich ............ | H01M 50/553 |
| 2003/0142490 A1 | 7/2003 | Parsons et al. | |
| 2003/0201738 A1 | 10/2003 | Yamamoto | |
| 2005/0058890 A1 | 3/2005 | Brazell et al. | |
| 2005/0248320 A1 | 11/2005 | Denning | |
| 2006/0091858 A1 | 5/2006 | Johnson et al. | |
| 2006/0219059 A1 * | 10/2006 | Kageler ............... | H01M 10/46 |
| | | | 81/52 |
| 2009/0108806 A1 | 4/2009 | Takano et al. | |
| 2009/0202894 A1 | 8/2009 | Bublitz | |
| 2009/0242227 A1 | 10/2009 | Hashimoto et al. | |
| 2010/0225277 A1 | 9/2010 | Ochi et al. | |
| 2011/0163701 A1 | 7/2011 | Carrier et al. | |
| 2011/0308831 A1 | 12/2011 | Martinsson et al. | |
| 2011/0309799 A1 | 12/2011 | Firehammer | |
| 2012/0013194 A1 | 1/2012 | Yamanoue | |
| 2012/0061117 A1 | 3/2012 | Nagasaka et al. | |
| 2012/0251229 A1 | 10/2012 | Liang et al. | |
| 2013/0089764 A1 | 4/2013 | Melnyk et al. | |
| 2013/0106343 A1 | 5/2013 | Cruise et al. | |
| 2013/0324981 A1 | 12/2013 | Smith et al. | |
| 2013/0324982 A1 | 12/2013 | Smith et al. | |
| 2014/0015451 A1 | 1/2014 | Funabashi et al. | |
| 2014/0147718 A1 | 5/2014 | Furui et al. | |
| 2014/0210419 A1 | 7/2014 | Kim | |
| 2014/0326477 A1 | 11/2014 | Thorson et al. | |
| 2015/0010782 A1 | 1/2015 | Tanigaki et al. | |
| 2015/0108949 A1 | 4/2015 | Averitt | |
| 2015/0228937 A1 | 8/2015 | Spilker | |
| 2015/0283964 A1 | 10/2015 | Janarthanam | |
| 2015/0288219 A1 | 10/2015 | Lin et al. | |
| 2015/0328764 A1 | 11/2015 | Yoshikane et al. | |
| 2015/0333301 A1 | 11/2015 | Ota et al. | |
| 2016/0020443 A1 | 1/2016 | White et al. | |
| 2016/0049815 A1 | 2/2016 | Wu et al. | |
| 2016/0126533 A1 | 5/2016 | Velderman et al. | |
| 2016/0164328 A1 | 6/2016 | Kim | |
| 2016/0204475 A1 | 7/2016 | White et al. | |
| 2016/0226290 A1 | 8/2016 | Johnson et al. | |
| 2016/0244009 A1 | 8/2016 | Demmerle | |
| 2016/0293909 A1 | 10/2016 | O'Sullivan et al. | |
| 2017/0072553 A1 | 3/2017 | Bakker | |
| 2017/0104243 A1 | 4/2017 | Velderman et al. | |
| 2017/0194670 A1 | 7/2017 | Kawano et al. | |
| 2018/0087758 A1 * | 3/2018 | Pavlik ................. | F21V 23/00 |
| 2018/0169851 A1 | 6/2018 | Radovich et al. | |
| 2018/0175458 A1 | 6/2018 | Radovich et al. | |
| 2018/0277801 A1 | 9/2018 | Brozek et al. | |
| 2019/0006980 A1 | 1/2019 | Sheeks et al. | |
| 2019/0081290 A1 | 3/2019 | Fauteux | |
| 2020/0016734 A1 | 1/2020 | Kelleher et al. | |

FOREIGN PATENT DOCUMENTS

| | | |
|---|---|---|
| CN | 203808341 U | 9/2014 |
| CN | 212366942 U | 1/2021 |
| DE | 1256763 B | 12/1967 |
| DE | 29702266 U1 | 5/1997 |
| DE | 29823347 U1 | 4/1999 |
| DE | 102008064037 A1 | 6/2009 |
| DE | 102008017424 A1 | 10/2009 |
| DE | 102011001107 B3 | 1/2012 |
| EP | 1516702 A2 | 3/2005 |
| EP | 2645525 A2 | 10/2013 |
| EP | 3059781 A1 | 2/2016 |
| EP | 3085499 A1 | 10/2016 |
| JP | 2005287240 A | 10/2005 |
| KR | 20060094231 A | 8/2006 |
| KR | 20120016993 A | 2/2012 |
| KR | 1020120094529 A | 8/2012 |
| KR | 101686018 B1 | 12/2016 |
| WO | 9605623 A1 | 2/1996 |
| WO | 0181132 A1 | 11/2001 |
| WO | 2008035811 A1 | 3/2008 |
| WO | 2012023707 A2 | 12/2012 |
| WO | 2014125758 A1 | 8/2014 |
| WO | 2016085540 A1 | 6/2016 |

OTHER PUBLICATIONS

International Search Report and Written Opinion for Application No. PCT/US2017/066966 dated Jul. 30, 2018, 19 pages.

(56) References Cited

OTHER PUBLICATIONS

International Search Report and Written Opinion for Application No. PCT/US2018/024172 dated Jul. 13, 2018, 18 pages.
Co-pending U.S. Appl. No. 29/637,376, filed Feb. 16, 2018.
International Search Report and Written Opinion for Application No. PCT/US2018/040587 dated Jan. 18, 2019, 28 pages.
Australian Patent Office Examination Report No. 1 for Application No. 2017378506 dated Oct. 3, 2019 (3 pages).
Extended European Search Report for Application No. 17879935.9 dated Mar. 2, 2021 (8 pages).
Korean Patent Office Action for Application No. 10-2019-7019764 dated Dec. 24, 2020 (12 pages including statement of relevance).

* cited by examiner

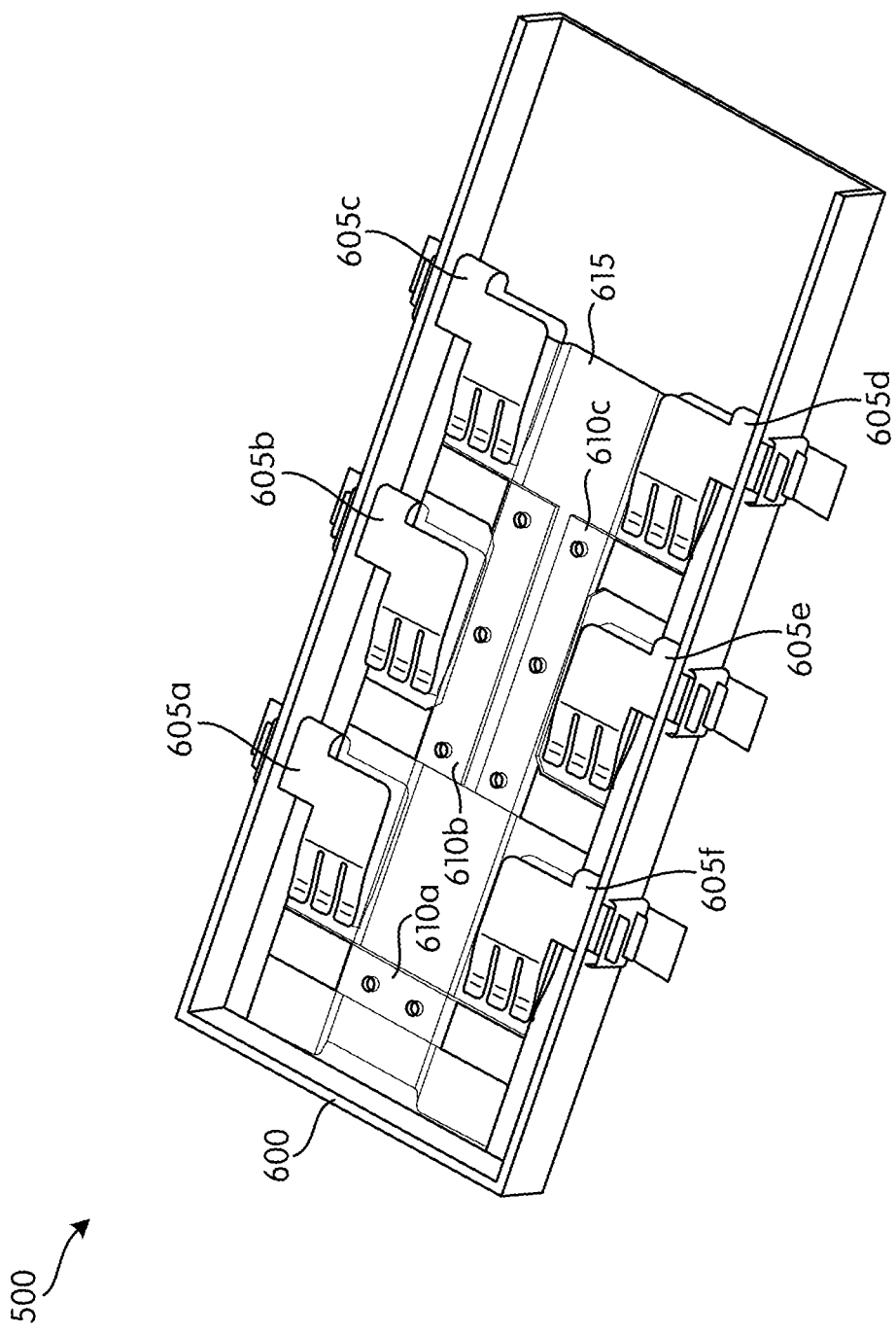

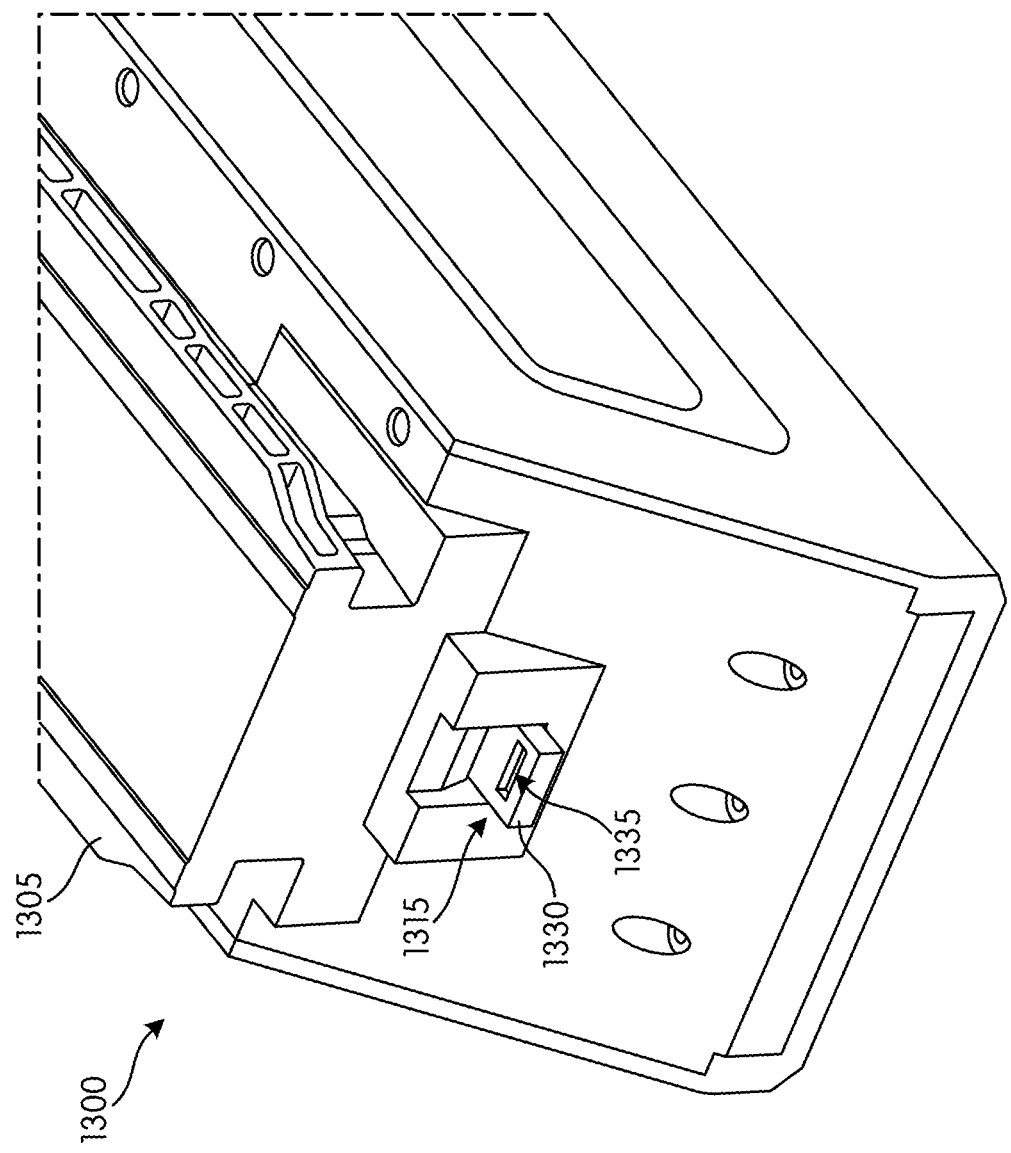

BATTERY PACK SWITCH

RELATED APPLICATIONS

This application is a continuation of U.S. patent application Ser. No. 15/845,068, filed Dec. 18, 2017, now U.S. Pat. No. 10,944,131, which claims priority to U.S. Provisional Patent Application No. 62/435,453, filed Dec. 16, 2016, the entire content of each of which is incorporated herein by reference.

FIELD

Embodiments relate to battery packs containing two or more battery cells.

SUMMARY

Electrical devices, such as power tools, outdoor tools, etc., may be configured to electrically connect to, and be powered by, a battery pack. Battery packs typically include one or more battery cells, such as battery cells having a lithium-ion chemistry. The battery cells are electrically connected together in a series-type configuration and/or a parallel-type configuration, such that the electrically-connected battery cells, and thus the battery pack, output a power having predetermined electrical characteristics (for example, a predetermined voltage, a predetermined power capacity, etc.) for powering the device.

Battery packs having cells with a lithium-ion chemistry may be subject to shipping regulations. Such shipping regulations may limit the voltage and/or power capacity of the battery pack being shipped.

In one independent embodiment, battery pack may generally include a housing defining an aperture, a first battery cell within the housing, a second battery cell within the housing, and a switch. The first battery cell is electrically connected to a first terminal. The second battery cell is electrically connected to a second terminal. The switch is configured to be in a first position and a second position. The switch includes a user-interface, which may extend through the aperture, and a plate, located within the housing. The plate includes a conductive portion and a non-conductive portion. The conductive portion is configured to electrically connect the first terminal to the second terminal when the switch is in the first position. The non-conductive portion is configured to galvanically isolate the first terminal from the second terminal when the switch is in the second position.

In another independent embodiment, a battery pack may generally include a housing, a first battery cell within the housing, a second battery cell within the housing, and a switch. The first battery cell may be electrically connected to a first terminal having a first upper foot and a first lower foot biased toward each other. The second battery cell may be electrically connected to a second terminal having a second upper foot and a second lower foot biased toward each other. The switch is configured to be in a first position and a second position. The switch includes a plate located within the housing. The plate includes a conductive portion configured to electrically connect the first terminal to the second terminal when the switch is in the first position, and a non-conductive portion configured to galvanically isolate the first terminal from the second terminal when the switch is in the second position.

In another embodiment, a battery pack including a housing, a first battery cell within the housing, a second battery cell within the housing, and a sliding switch. The first battery cell is electrically connected to a first terminal. The second battery cell is electrically connected to a second terminal. The sliding switch is located on an exterior portion of the housing. The sliding switch is configured to be in a first position and a second position. The sliding switch includes a plate having a conductive portion and a non-conductive portion. The conductive portion is configured to electrically connect the first terminal to the second terminal when the switch is in the first position. The non-conductive portion is configured to galvanically isolate the first terminal from the second terminal when the switch is in the second position.

In another embodiment, a battery pack including a housing defining an aperture, a first battery cell within the housing, a second battery cell within the housing, and a plate. The first battery cell is electrically connected to a first terminal. The second battery cell is electrically connected to a second terminal. The plate is configured to be in a first position and a second position. The plate includes a plunger extending from the plate into the aperture. The plunger includes a conductive portion and a non-conductive portion. The conductive portion is configured to electrically connect the first terminal to the second terminal when the plunger is in the first position. The non-conductive portion is configured to galvanically isolate the first terminal from the second terminal when the plunger is in the second position.

In another independent embodiment, a battery pack may generally include a housing, a first battery cell disposed within the housing, a second battery cell disposed within the housing, and a switch located on an exterior of the housing and configured to be in a first or on position, in which the first battery cell is electrically connected to the second battery cell, or in a second or off position, in which the first battery cell is electrically disconnected from the second battery cell.

In another independent embodiment, a battery pack may generally include a housing, a first battery cell within the housing, a second battery cell within the housing, and a switch located on an exterior of the housing and configured to be in a first position and a second position. The switch may include a first terminal electrically connected to the first battery cell, a second terminal electrically connected to the second battery cell, a conductive portion configured to engage the first terminal and the second terminal when the switch is in the first position, and a non-conductive portion configured to engage at least one of the first terminal and the second terminal when the switch is in the second position.

In yet another independent embodiment, a battery pack may generally include a housing defining an aperture, a first battery cell within the housing, a second battery cell within the housing, and a switch located on an exterior of the housing and configured to be in a first position, in which the first battery cell is electrically disconnected from the second battery cell, and a second position, in which the first battery cell is electrically connected to the second battery cell. The switch may include a plate, a male member configured to be inserted into the aperture when the switch is in the second position, and a biasing member biasing the plate away from the housing.

In some constructions, the housing may include the switch. In some constructions, the switch may be configured to slide between the first position and the second position.

In some embodiments, the battery pack may be configured to output 72V when the switch is in the on position. In some embodiments, the battery pack may be configured to output 120V when the switch is in the on position. In some embodiments, the battery pack may be configured to have a power capacity approximately equal to or less than 100 watt-hours. In some embodiments, the battery pack may be configured to have a power capacity approximately equal to or less than 300 watt-hours.

Other independent aspects of the application will become apparent by consideration of the detailed description and accompanying drawings.

BRIEF DESCRIPTION OF THE DRAWINGS

FIGS. 7A and 7B are perspective views a switch of the battery pack of FIG. 6, illustrating operation of the switch.

FIGS. 14A and 14B are perspective view of a switch of the battery pack of FIG. 13.

DETAILED DESCRIPTION

Before any independent embodiments of the application are explained in detail, it is to be understood that the application is not limited in its application to the details of construction and the arrangement of components set forth in the following description or illustrated in the following drawings. The application is capable of other independent embodiments and of being practiced or of being carried out in various ways.

The phrase "series-type configuration" as used herein refers to a circuit arrangement in which the described elements are arranged, in general, in a sequential fashion such that the output of one element is coupled to the input of another, though the same current may not pass through each element. For example, in a "series-type configuration," additional circuit elements may be connected in parallel with one or more of the elements in the "series-type configuration." Furthermore, additional circuit elements can be connected at nodes in the series-type configuration such that branches in the circuit are present. Therefore, elements in a series-type configuration do not necessarily form a true "series circuit."

Additionally, the phrase "parallel-type configuration" as used herein refers to a circuit arrangement in which the described elements are arranged, in general, in a manner such that one element is connected to another element, such that the circuit forms a parallel branch of the circuit arrangement. In such a configuration, the individual elements of the circuit may not have the same potential difference across them individually. For example, in a parallel-type configuration of the circuit, two circuit elements in parallel with one another may be connected in series with one or more additional elements of the circuit. Therefore, a circuit in a "parallel-type configuration" can include elements that do not necessarily individually form a true "parallel circuit."

Figure 1A:
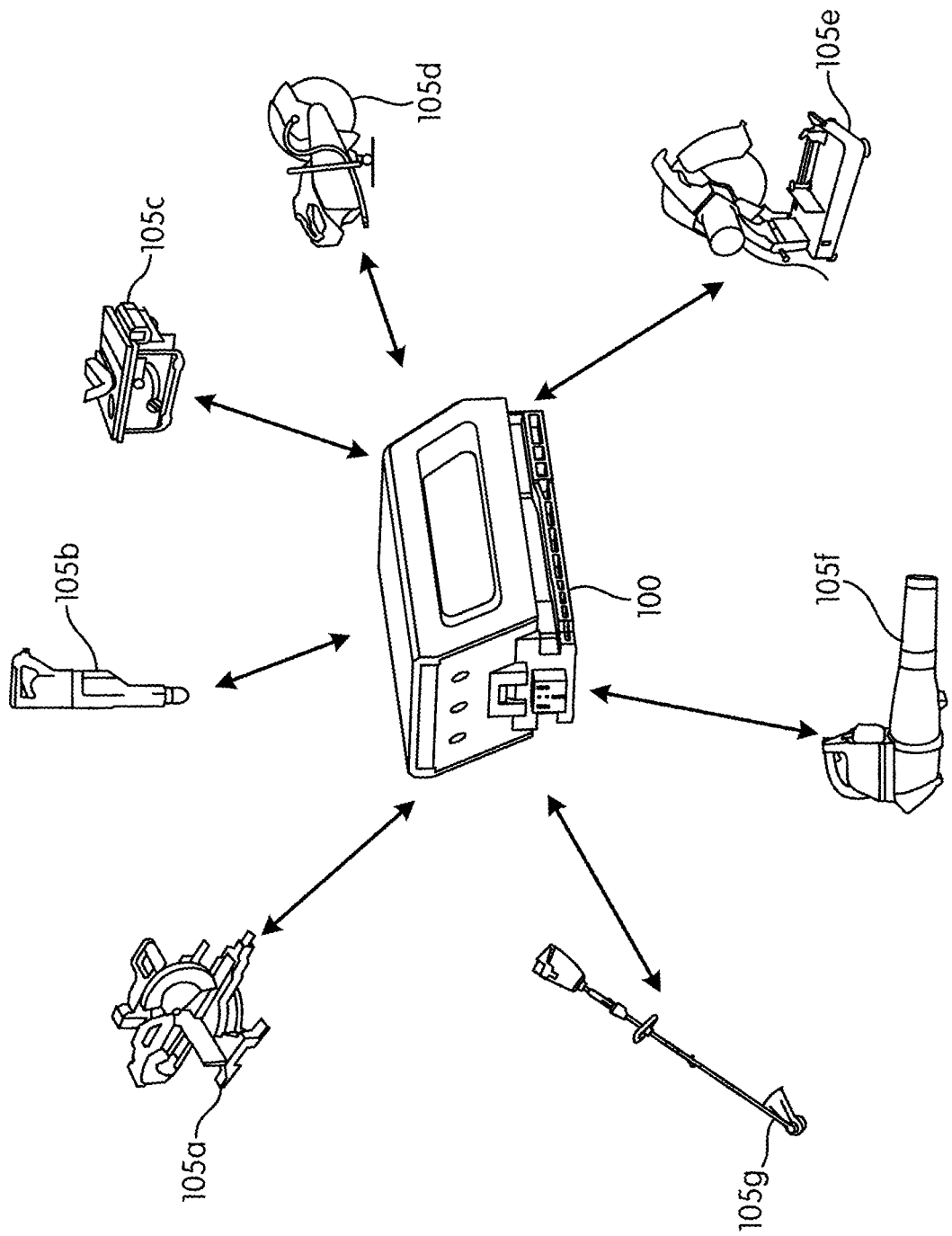
FIG. 1A illustrates a battery pack system.
Figure 1B:
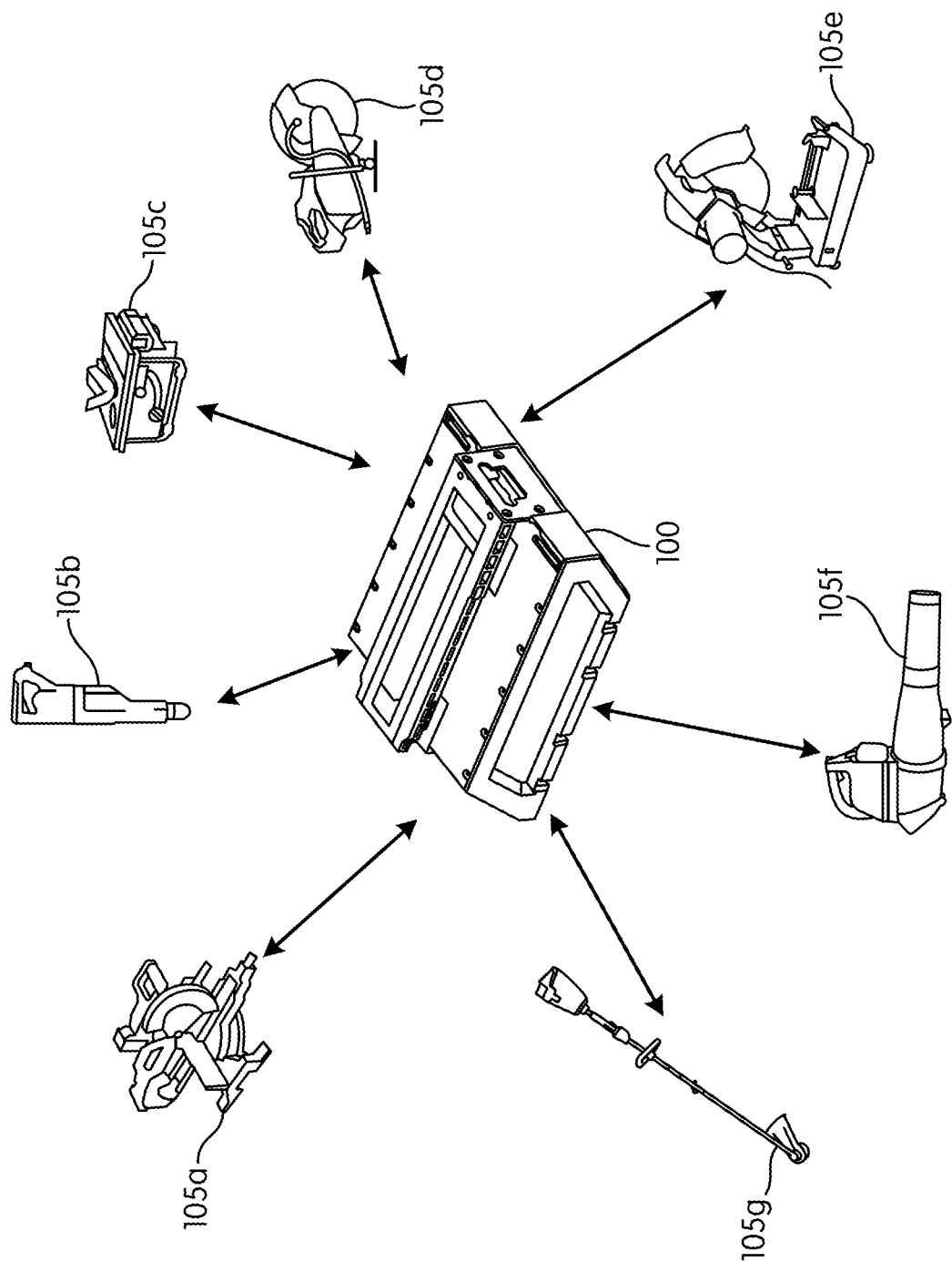
FIG. 1B illustrates a battery pack system.

FIGS. 1A and 1B illustrate a battery pack 100 according to some independent embodiments of the application. The battery pack 100 is configured to couple (e.g., electrically, electronically and physically) to one or more electrical devices 105a-105g, such as power tools, outdoor tools, etc. In the illustrated embodiment, the devices 105a-105g include, for example, a miter saw 105a, a rotary hammer 105b, a table saw 105c, a circular saw 105d, a cut-off machine 105e, a leaf blower 105f, and a string trimmer 105g. However, the battery pack 100 may be configured to couple to other electrical devices (not shown).

Figure 2:
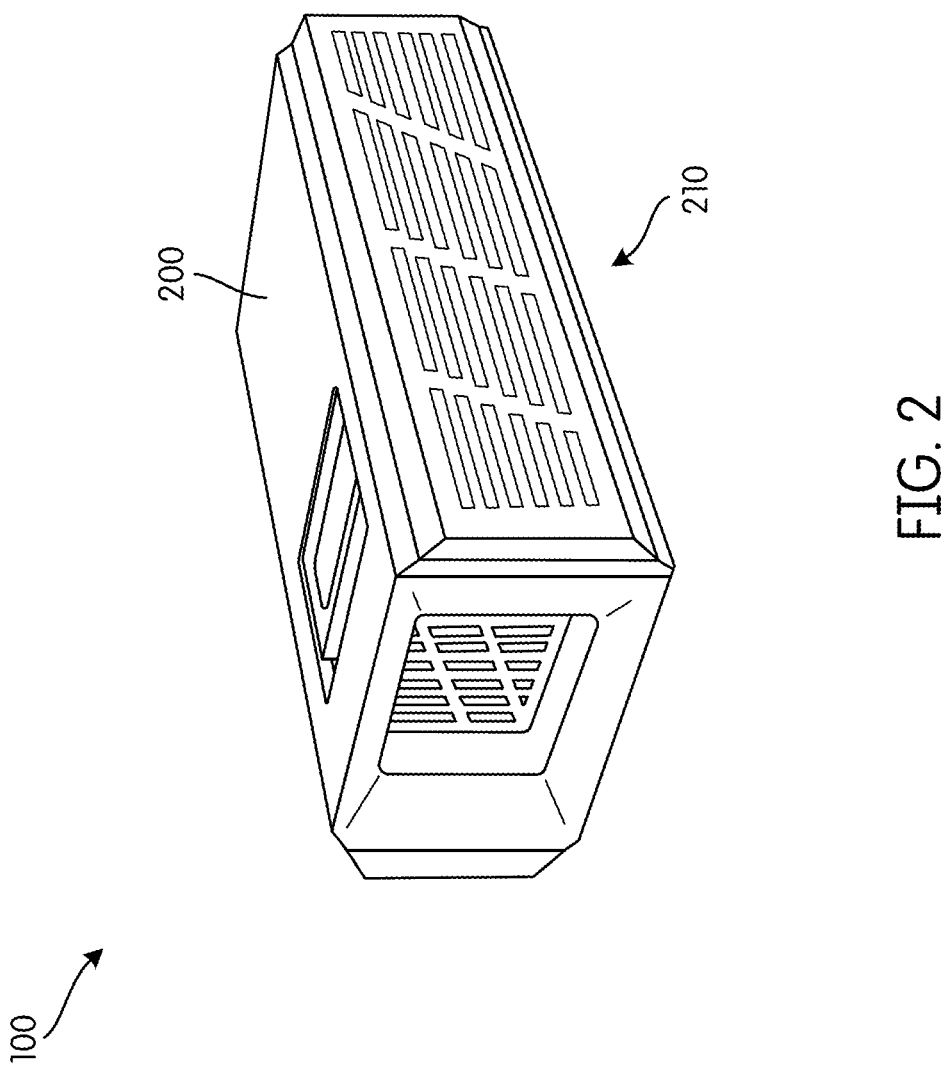
FIG. 2 is a perspective view of a battery pack of the battery pack systems of FIG. 1A and/or FIG. 1B.

As shown in FIG. 2, the battery pack 100 includes a housing 200. The housing 200 may be formed of plastic or a similar material. The housing 200 includes a battery pack interface 210 to electrically and physically connect the battery pack 100 to the one or more devices 105. In some embodiments, the interface 210 includes a positive terminal, a ground terminal, and a communication terminal. Although illustrated as a rail and groove interface, in other embodiments, the interface 210 may be a receptacle and stem interface.

Figure 3:
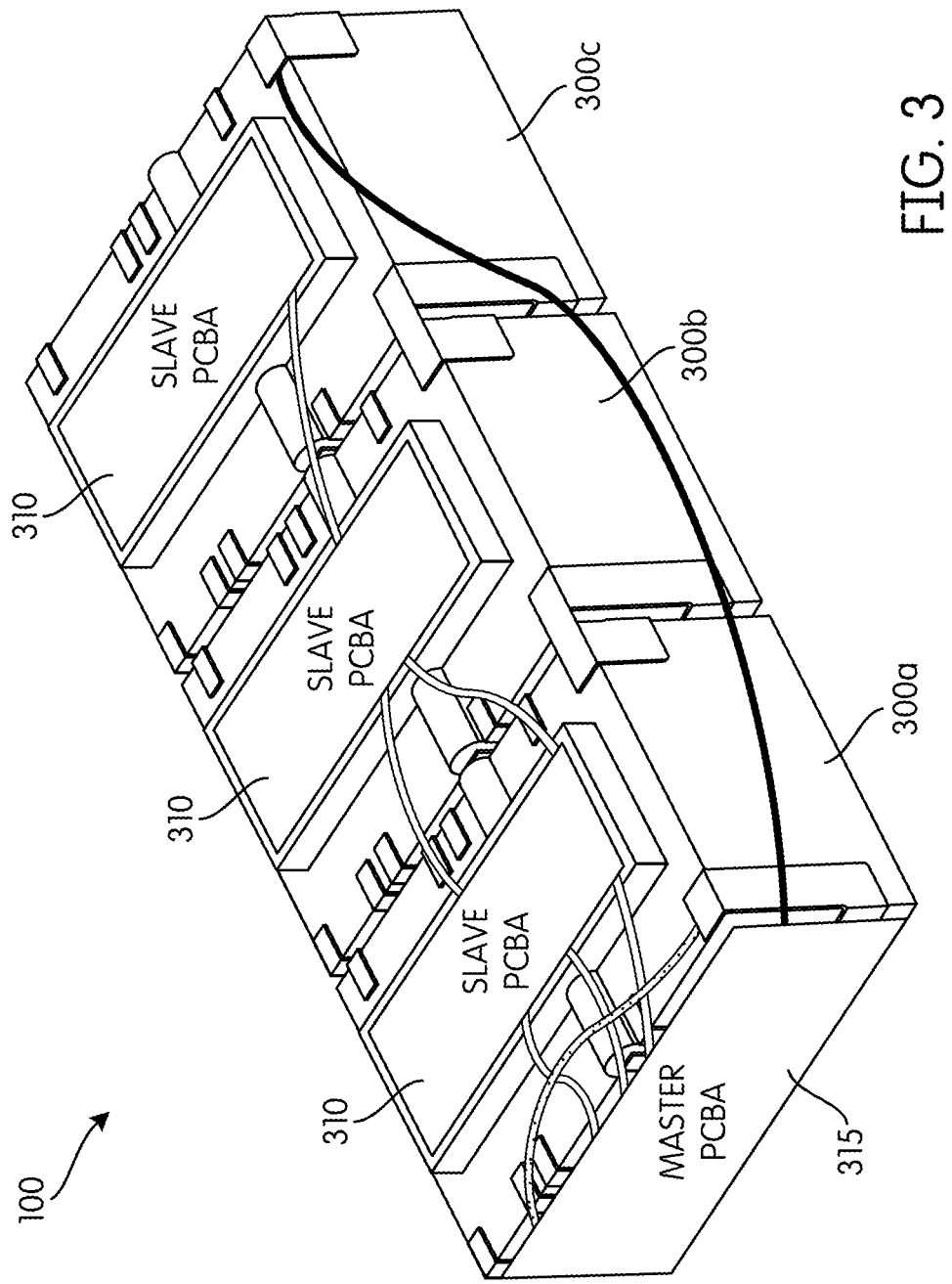
FIG. 3 is a perspective view of a plurality of subcores of the battery pack of FIG. 2.

FIG. 3 illustrates individual batteries, or electrical subcores, 300a, 300b, 300c, . . . 300n (three illustrated) contained within the housing 200. Each subcore 300a-300c is electrically and/or communicatively coupled to a slave controller 310, or slave printed circuit board assembly (PCBA). Each slave controller 310 is electrically and/or communicatively coupled to a master controller 315, or a master PCBA. As discussed in further detail below, the electrical subcores 300a-300c are configured to be selectively electrically connected in a series-type configuration and/or a parallel-type configuration.

Figure 4:
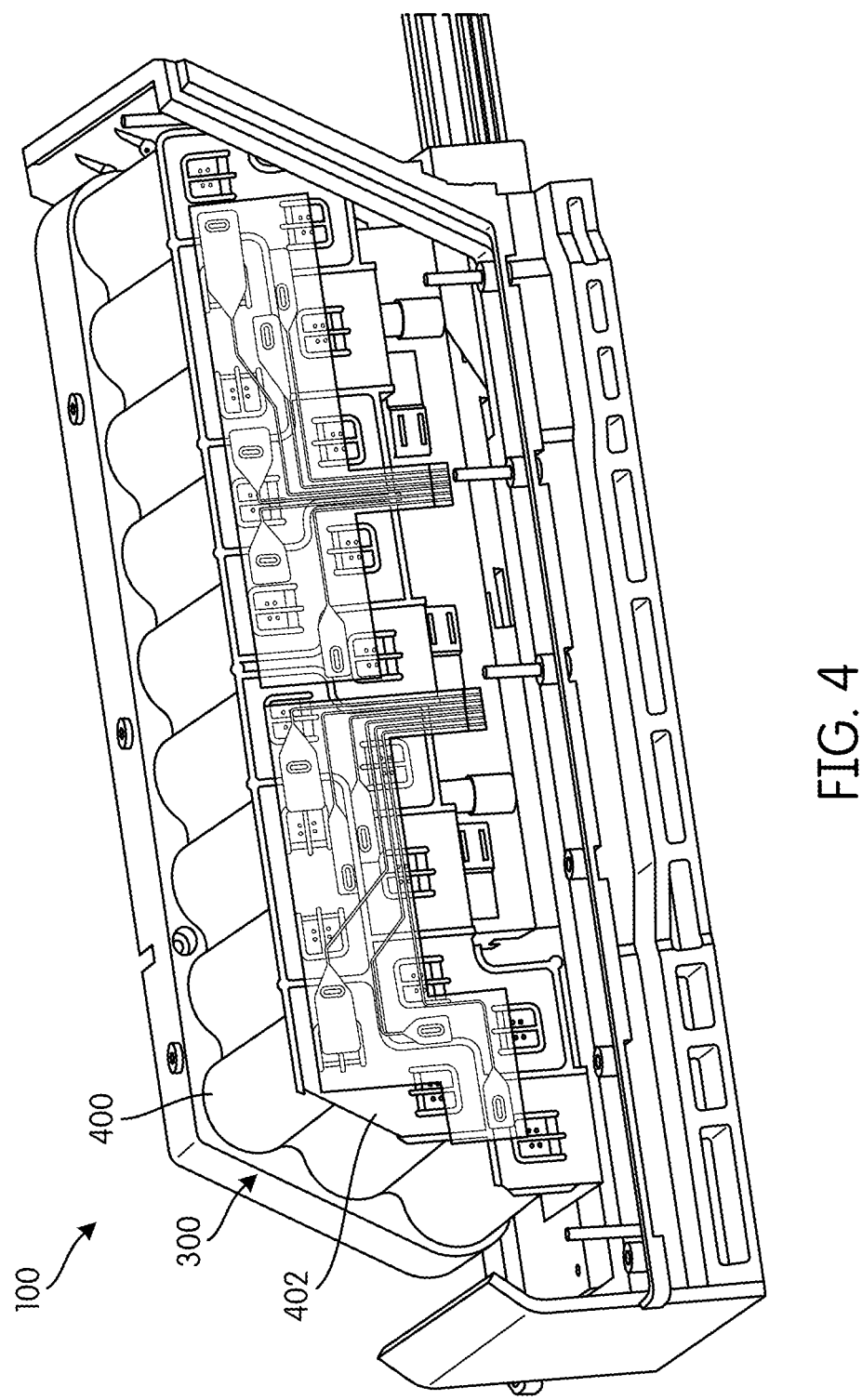
FIG. 4 is partial cutaway view of a plurality of battery cells within the battery pack of FIG. 1A and/or FIG. 1B.

FIG. 4 illustrates a plurality of cells 400 located within the housing 200. As illustrated, the cells 400 may be physically and/or electrically grouped into electrical subcores 300. In the illustrated construction, the cells 400, and thus the electrical subcores 300, are electrically connected to each other via a plurality of straps 402. In some embodiments, the straps 402 are permanently attached (for example, welded) to the cells 400. Although illustrated as having a layout of four subcores 300 each including five cells 400 (for a total of twenty cells 400), in other constructions, there may be more or less cells in varying layouts.

Figure 5:
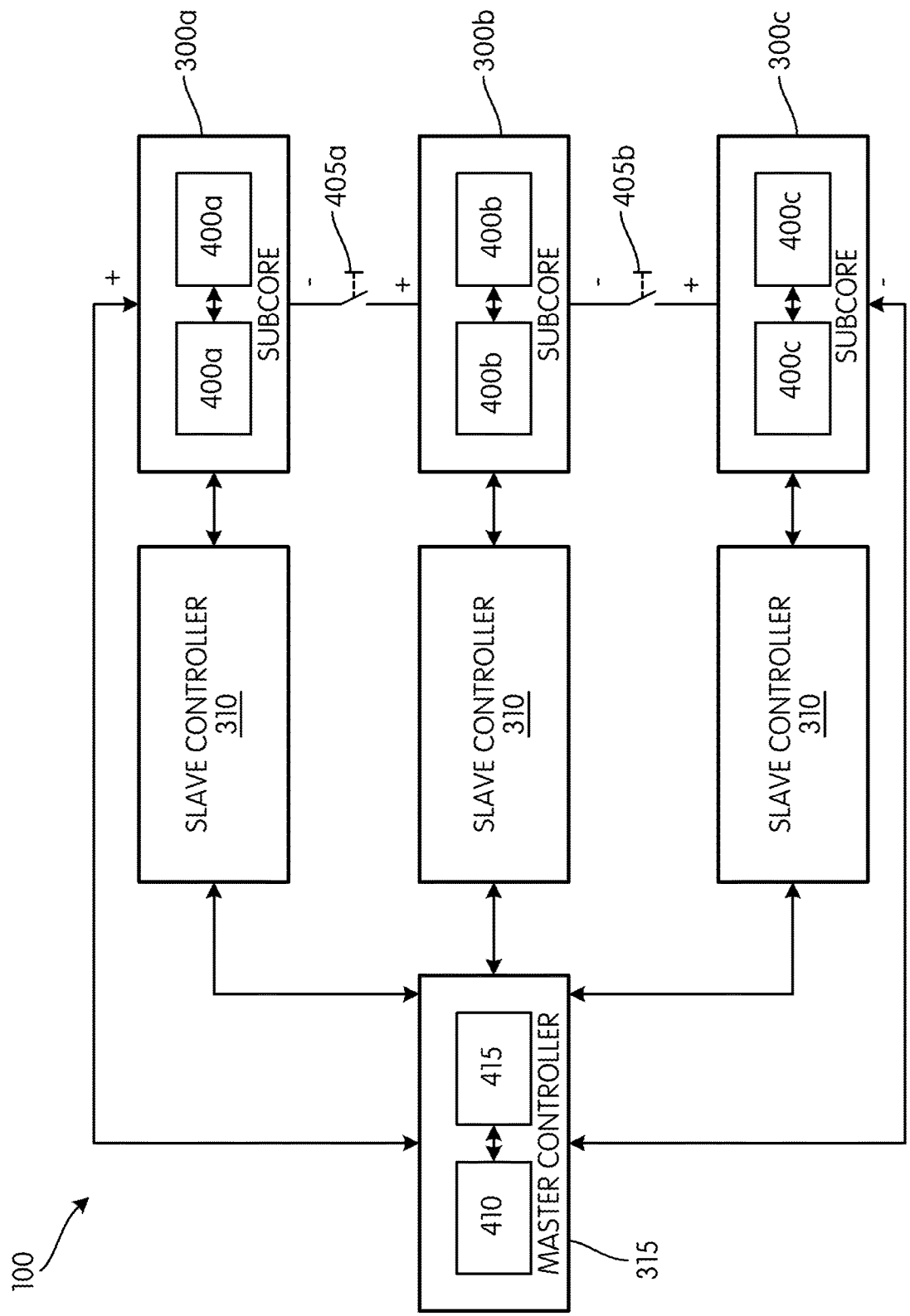
FIG. 5 is a block diagram of the battery pack of FIG. 2.

FIG. 5 is a block diagram of battery pack 100. Although illustrated as only having two battery cells 400, each subcore 300a-300c includes one or more battery cells 400a, 400b, 400c, respectively. In some embodiments, each subcore 300 includes ten battery cells 400. The battery cells 400a-400c may have a lithium-ion, or similar chemistry. The battery cells 400a, 400b, 400c, contained within their respective subcores 300a, 300b, 300c, may be electrically connected in a series-type configuration and/or a parallel-type configuration such that each subcore 300a, 300b, 300c provides a desired voltage, a desired current output, and a desired power capacity. In some embodiments, the subcores 300a, 300b, 300c have approximately the same voltage, current, and power capacity. In other embodiments, the subcores 300a, 300b, 300c may have different voltages, currents, or power capacities.

As discussed above, the subcores 300a-300c are selectively electrically connected to each other. In the illustrated embodiment, the subcores 300a-300c are selectively electrically connected to each other via electric switching devices 405a and 405b. Although illustrated as being electrically connected in a series-type configuration, in other embodiments, the subcores 300a-300c may be alternatively, or additionally, in a parallel-type configuration, such that the electrically connected the subcores 300a-300c, and thus battery pack 100, provides a desired pack voltage, a desired pack current output, and a desired pack power capacity.

The master controller 315 includes a plurality of electrical and electronic components providing power, operational control, protection, etc., to the components and modules within the master controller 315 and/or the battery pack 100. For example, the master controller 315 includes, among other things, a processing unit 410 (e.g., a microprocessor, a microcontroller, or another suitable programmable device) and a memory 415. In some embodiments, the master controller 315 is implemented partially or entirely on a printed circuit board or a semiconductor (e.g., a field-programmable gate array ("FPGA") semiconductor) chip, such as a chip developed through a register transfer level ("RTL") design process. In some embodiments, the master controller 315 may include further modules, such as, but not limited to a communications module (for example, a WiFi module and/or a Bluetooth module). In some embodiments, the slave controllers 310 include similar components.

The master controller 315 receives power from, and monitors, the electrically-connected subcores 300. For example, in some embodiments, the master controller 315 monitors characteristics of the pack 100, such as a pack voltage, a pack current, one or more pack temperatures, and a pack power capacity. The slave controllers 310 receive power from, and monitor, the individual subcores 300a-300c. For example, in some embodiments, the slave controllers 310 monitor characteristics of the respective subcore 300, such as a subcore voltage, a subcore current, a subcore temperature, and a subcore power capacity. The slave controllers 310 may further be communicatively coupled to the master controller 315 and communicate characteristics of the respective subcore 300, such as subcore voltages, subcore currents, subcore temperatures, and subcore power capacities, to the master controller 315.

Figure 6:
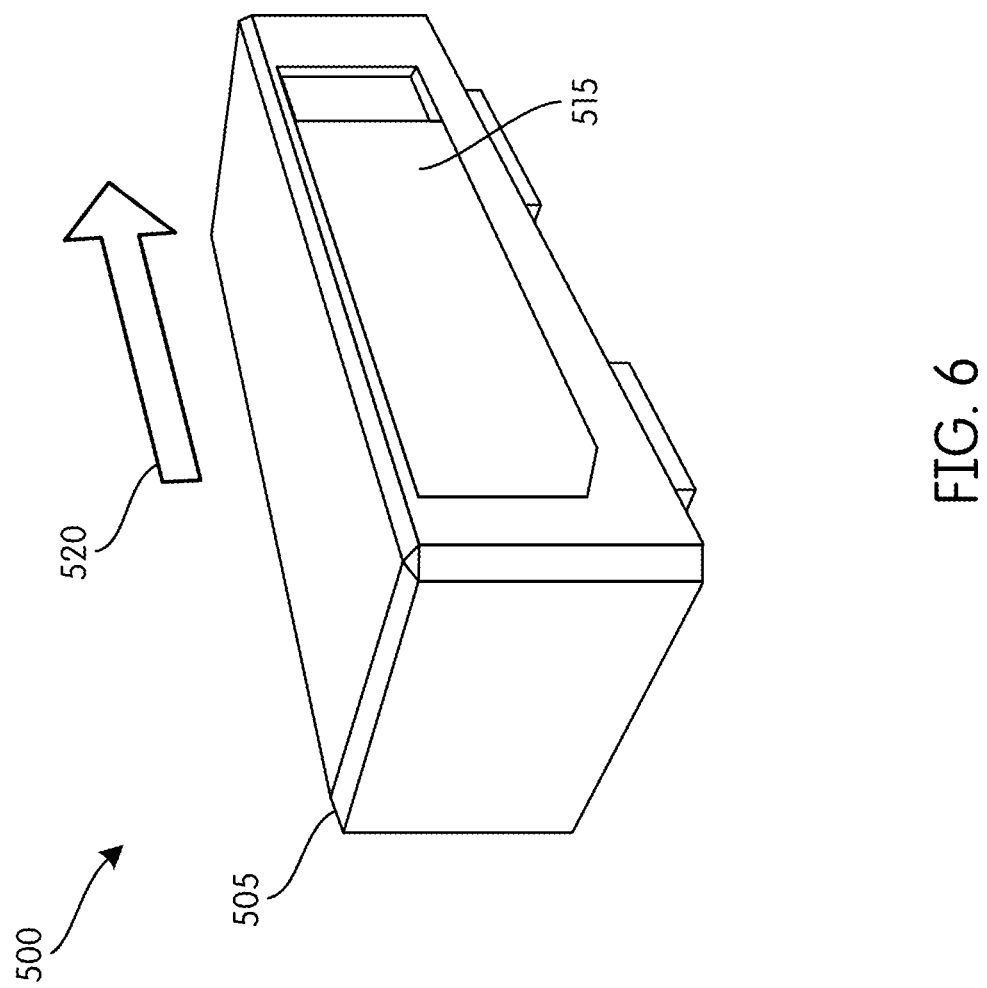
FIG. 6 is a perspective view of an alternative construction of a battery pack.

FIG. 6 illustrates an alternative battery pack 500. The battery pack 500 may include substantially similar components as discussed above in relation to the battery pack 100.

The battery pack 500 includes a battery pack housing 505 which may be substantially similar to battery pack housing 200 discussed above. The housing 505 has a battery pack interface 510 and a switch or cap 515. As discussed in more detail below, the switch 515 is configured to be in a first position and a second position. When in the first (e.g., "OFF") position, electrical components (for example, the subcores 300) of the battery pack 500 contained within the housing 505 are electrically disconnected from each other. When in the second (e.g., "ON") position, electrical components (for example, the subcores 300) are electrically connected to each other. The switch 515 may be manipulated by a user from the first position to the second position. For example, in the illustrated embodiment, the switch 515 is slid in a first direction 520 to electrically connect the electrical components.

Figure 7A:
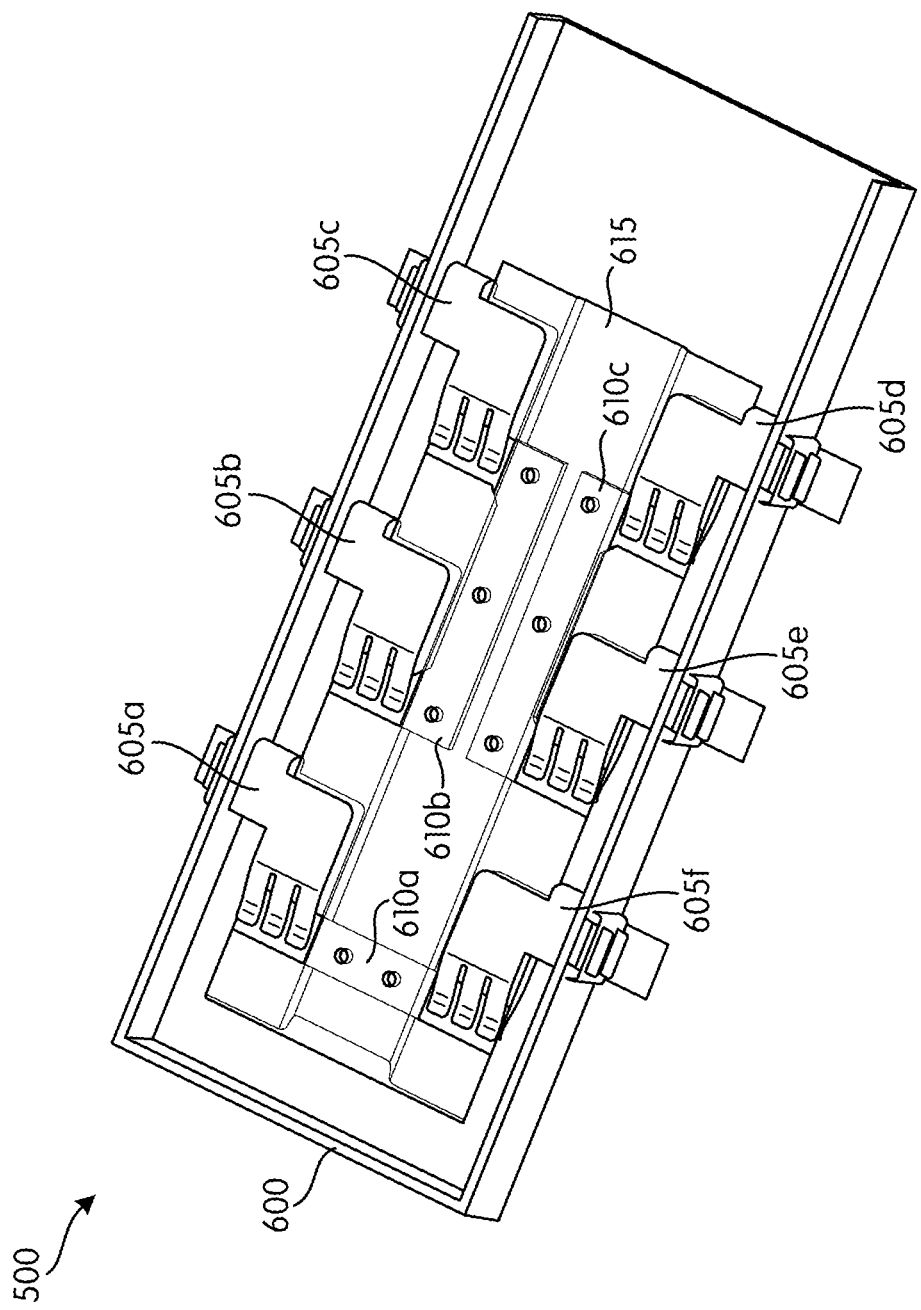

FIGS. 7A and 7B illustrate the switch 515 of the battery pack 500. The switch 515 includes a shell 600, terminals 605a, 605b, 605c, ... 605n, a conductive bus 610, and a non-conductive layer 615. Similar to the housings 200 (FIGS. 2) and 505 (FIG. 6), the shell 600 may be formed of plastic or a similar material. The shell 600 is slidingly coupled to the housing 505 (FIG. 6), while the conductive bus 610 and non-conductive layer 615 are coupled, or integral to, the housing 505 (FIG. 6), such that the shell 600 are slidingly coupled to the conductive bus 610 and non-conductive layer 615.

Figure 8:
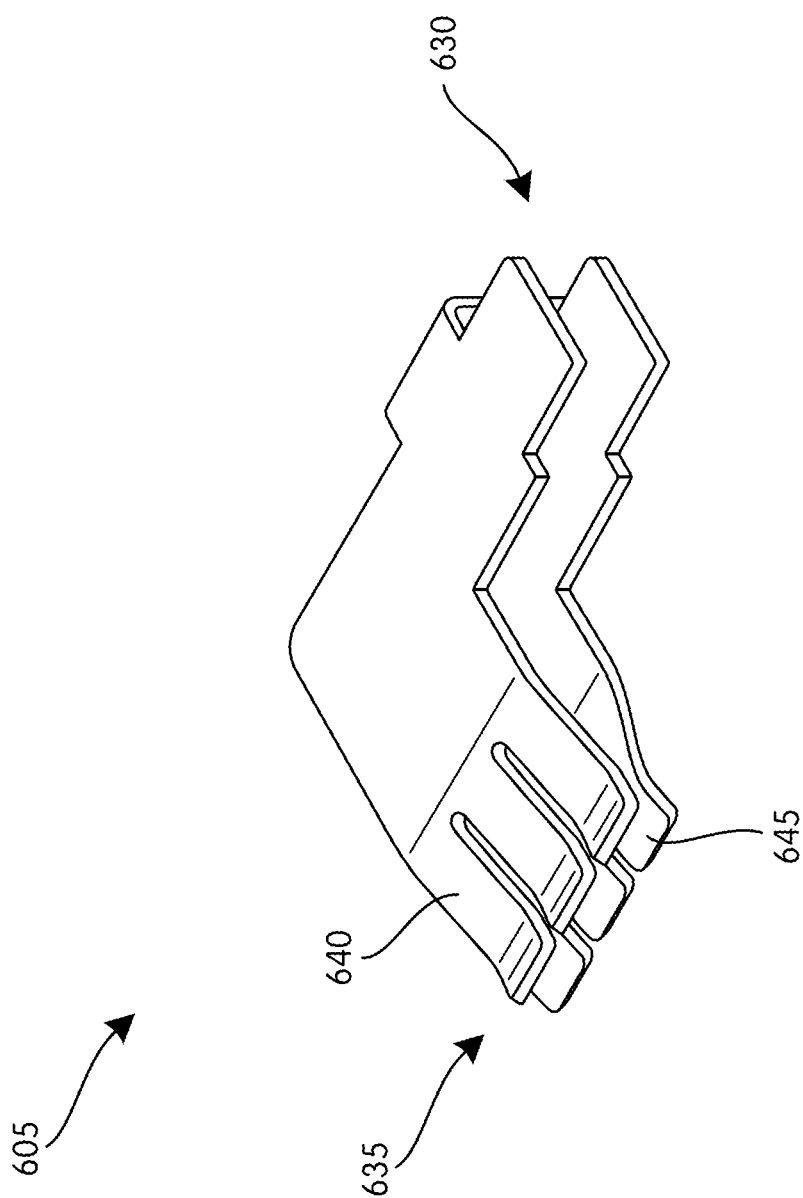
FIG. 8 illustrates a terminal of the switch of FIGS. 7A and 7B.

Although illustrated as having six terminals 605a-605f, in other embodiments (not shown), the battery pack 500 may have fewer or more terminals 605. Each terminals 605 has a first end 630 coupled to the shell 600 and electrically coupled to the subcores 300 (for example, via subcore terminals). Each terminal 605 has a second end 635 configured to slidingly contact, when the switch is in the off position, the non-conductive layer 615 and, when the switch 515 is in the on position, the conductive bus 610. As illustrated in FIG. 8, the second end 625 includes an upper foot 640 and a lower foot 645. In such an embodiment, the upper foot 640 and the lower foot 645 are biased toward each other and configured to grasp the conductive bus 610 or the non-conductive layer 615 in order to make physical contact.

Returning to FIGS. 7A and 7B, the conductive bus 610 is composed of a conductive material, such as but not limited to, a substantially copper material. In the illustrated embodiment, the conductive bus 610 includes a number conductive buses 610a, 610b, 610c, ... 610n corresponding to the terminals 605. As illustrated in FIG. 7A, when the switch 515 is in the on position, the first conductive bus 610a provides an electrical connection between the terminals 605a and 605f, the second conductive bus 610b provides an electrical connection between the terminals 605b and 605c, and the third conductive bus 610c provides an electrical connection between the terminals 605d and 605e.

The non-conductive layer 615 is composed of a non-conductive material, such as but not limited to, a substantially plastic or silicon material. As illustrated in FIG. 7B, when the switch 515 is in the off position, the non-conductive layer 615 prevents an electrical connection between the terminals 605a-605f.

Figure 9A:
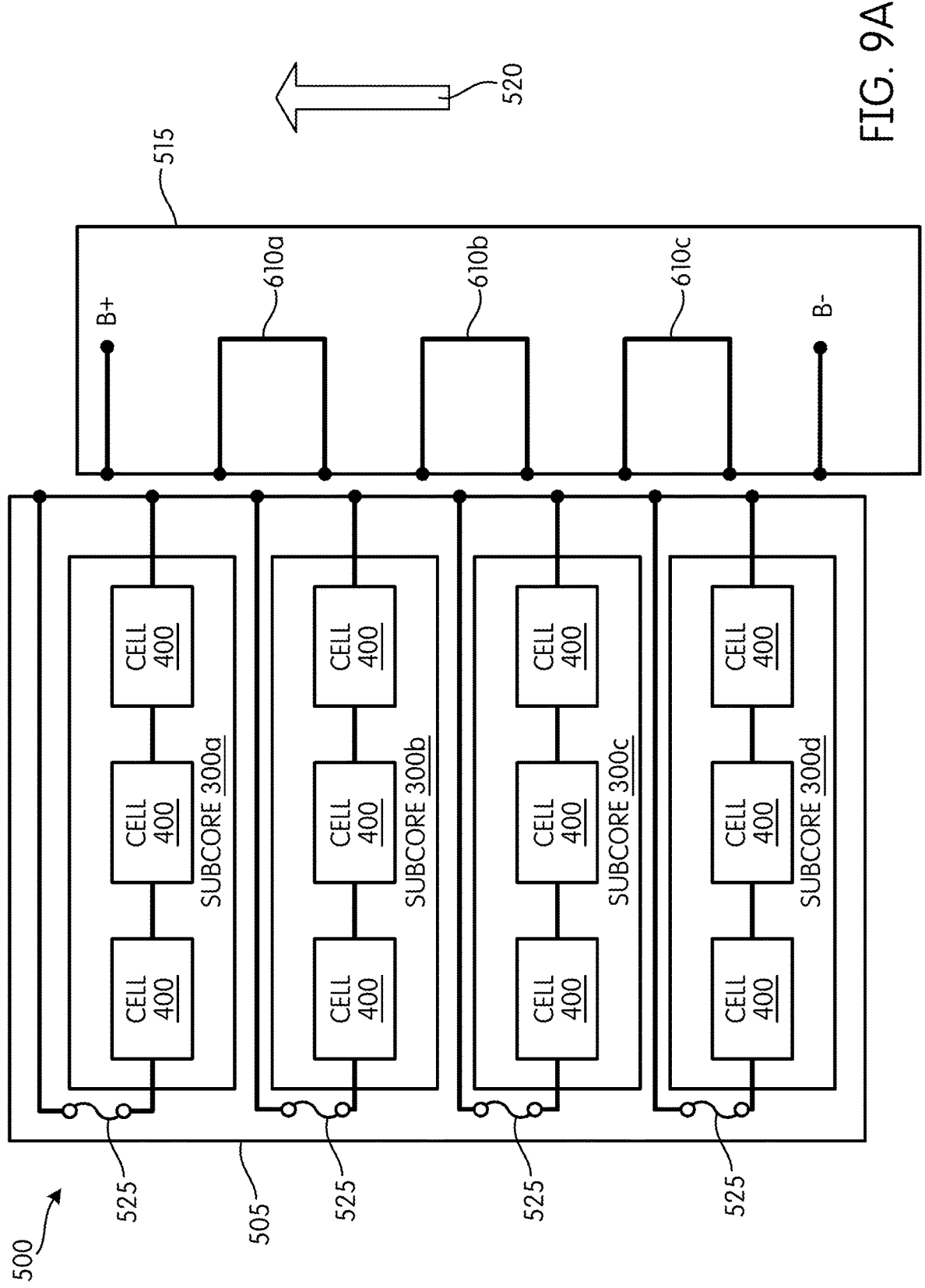
FIGS. 9A and 9B are block diagrams of the battery pack of FIG. 6, illustrating operation of the switch.
Figure 9B:
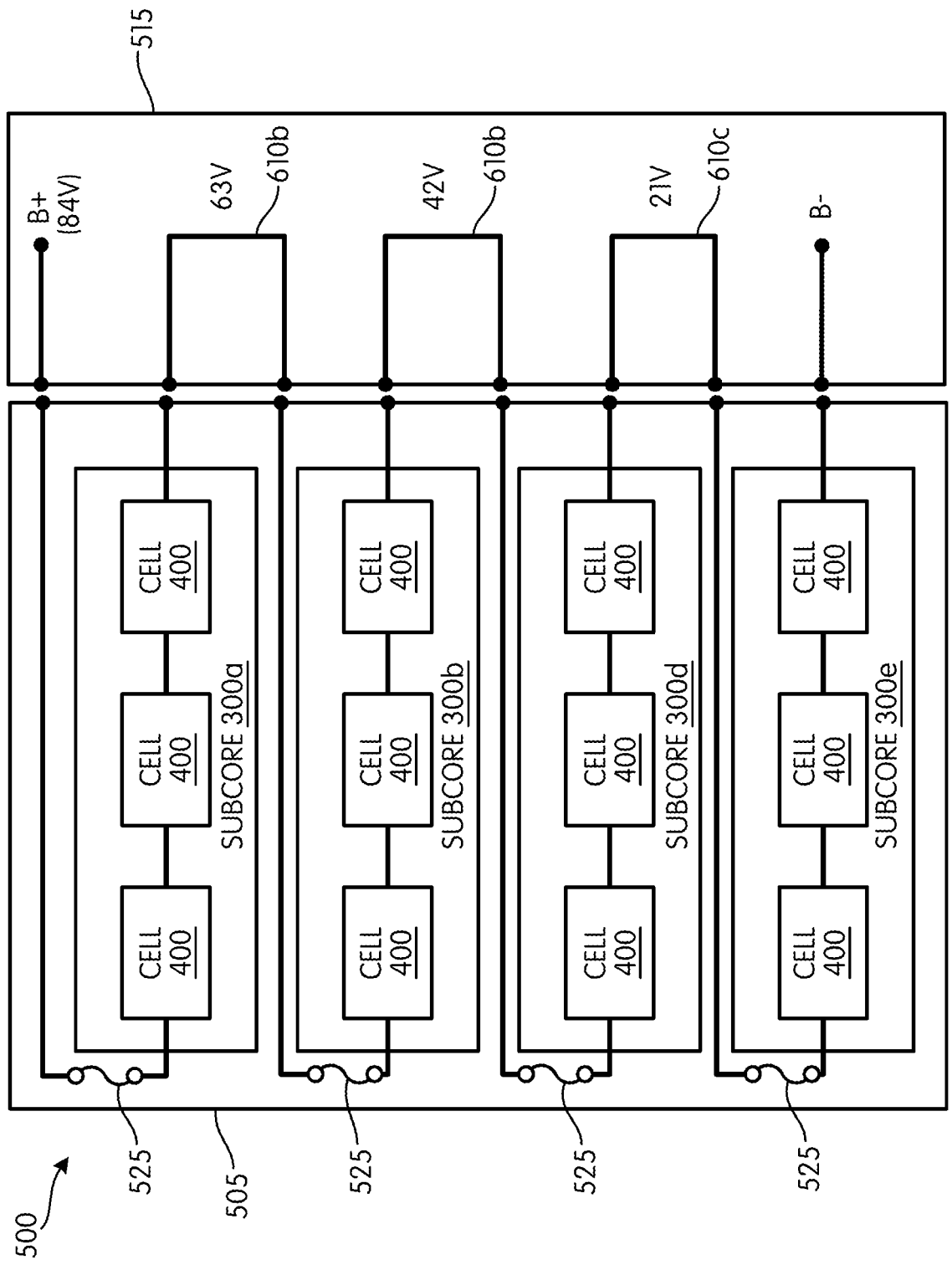

FIGS. 9A and 9B are block diagrams of the battery pack 500 and switch 515. FIG. 9A illustrates the battery pack 500 in the first (e.g., "OFF") state. As illustrated, when in the off state, the subcore 300a is electrically disconnected from the subcore 300*b*, the subcore 300*b* is electrically disconnected from the subcore 300*c*, and the subcore 300*c* is electrically disconnected from the subcore 300*d*.

FIG. 9B illustrates the battery pack 500 in the second (e.g., "ON") state. As illustrated, when in the on state, the subcore 300*a* is electrically connected to the subcore 300*b* via the first conductive bus 610*a*, the subcore 300*b* is electrically connected to the subcore 300*c* via the second conductive bus 610*b*, and the subcore 300*c* is electrically connected to the subcore 300*d* via the third conductive bus 610*c*.

In the illustrated embodiment, each subcore 300*a*-300*d* has a nominal voltage of approximately 21V. Thus, battery pack 500 has a nominal pack voltage of approximately 72V. In other embodiments, the battery pack 500 may have a nominal voltage of approximately 70V to approximately 80V. In yet another embodiment, the battery pack 500 may have a nominal voltage of approximately 100V to approximately 130V (for example, approximately 108V). In yet another embodiment, the battery pack 500 may have a nominal voltage of approximately 30V to approximately 40V (for example, approximately 36V). In some embodiments, each subcore 300*a*-300*d* has a power capacity approximately equal or less than 100 Wh. In some embodiments, each subcore 300*a*-300*d* has a power capacity approximately equal or less than 300 Wh. In some embodiments, battery pack 500 may have a power capacity approximately equal to or greater than 300 Wh. In some embodiments, the battery pack 500 may have a power capability of approximately 3000 Watts to approximately 5500 Watts.

In the illustrated embodiment, the battery pack 500 further includes a plurality of fuses 525. The fuses 525 provide overcurrent protection between the subcores 300*a*-300*d*.

Figure 10:
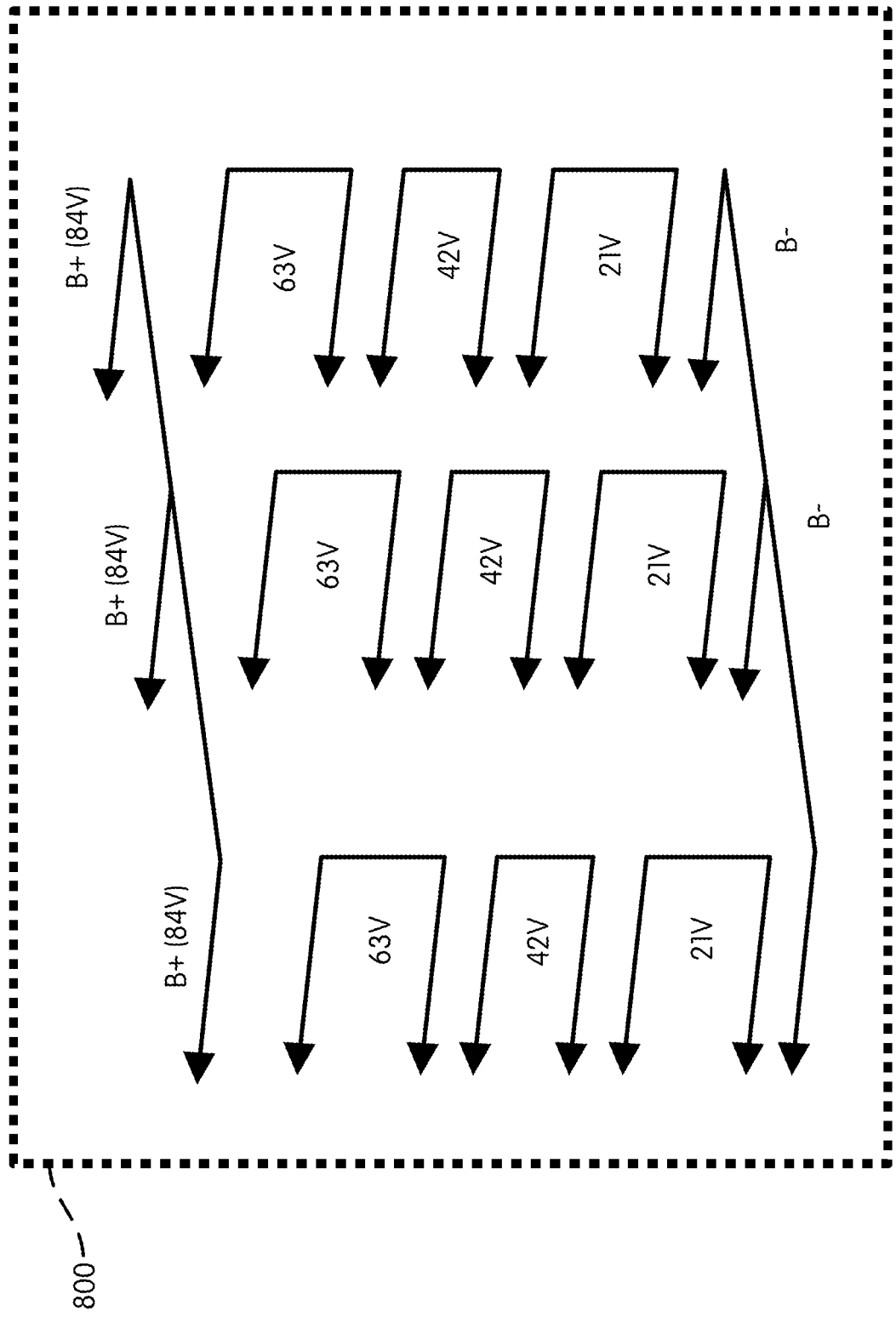
FIG. 10 is an electrical diagram of a switch.

FIG. 10 is an electrical diagram of a switch 800 configured to selectively electrically connect a plurality of subcores 300 in a series-type configuration and a parallel-type configuration. As illustrated, the switch 800 electrically connects a plurality of subcores 300 in a series-type configuration such that the subcores 300 have a nominal voltage of approximately 70V to approximately 90V (for example, 72V, 84V, etc.). The switch 800 also electrically connects the subcores 300 in a parallel-type configuration such that the battery pack has a power capacity approximately equal to or greater than 300 Wh. Thus, in such an embodiment, the battery pack will have a nominal voltage of approximately 70V to approximately 90V (for example, 72V, 84V, etc.) and a power capacity approximately equal to or greater than 300 Wh. In such an embodiment, each subcore has a power capacity of approximately equal or less than 100 Wh. In other embodiments, the battery pack may have a nominal voltage of approximately 70V to approximately 80V (for example, approximately 72V). In yet another embodiment, the battery pack may have a nominal voltage of approximately 100V to approximately 130V (for example, approximately 108V). In yet another embodiment, the battery pack may have a nominal voltage of approximately 30V to approximately 40V (for example, approximately 36V). In some embodiments, the battery pack 500 may have a power capability of approximately 3000 Watts to approximately 5500 Watts.

Figure 11:
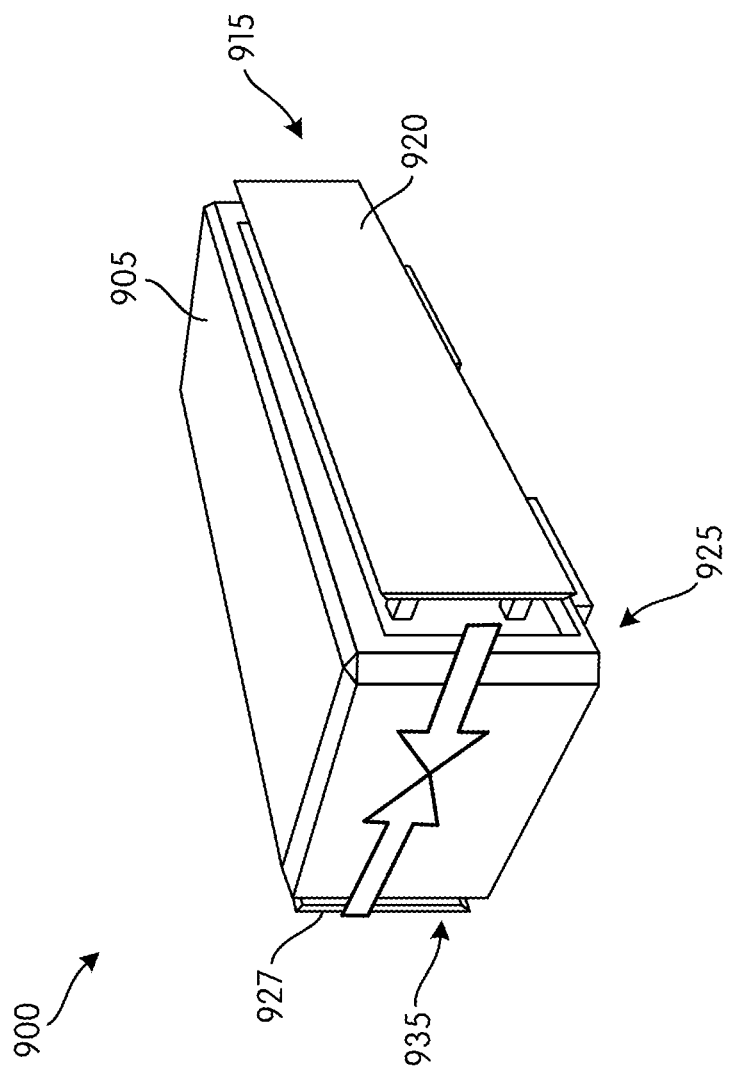
FIG. 11 is a perspective view of another alternative construction of a battery pack.

FIG. 11 illustrates another alternative battery pack 900. The battery pack 900 may include substantially similar components as discussed above in relation to the battery pack 100, 500.

The battery pack 900 includes a housing 905 having an interface 910 and a switch 915. The switch 915 includes at least one plate 920 located on a first side 925 of the battery pack 900. In the illustrated embodiment, the switch 915 includes a second plate 930 located on a second side 935, opposite the first side 925. In such an embodiment, the second plate 927 is substantially similar to plate 920.

Figure 12A:
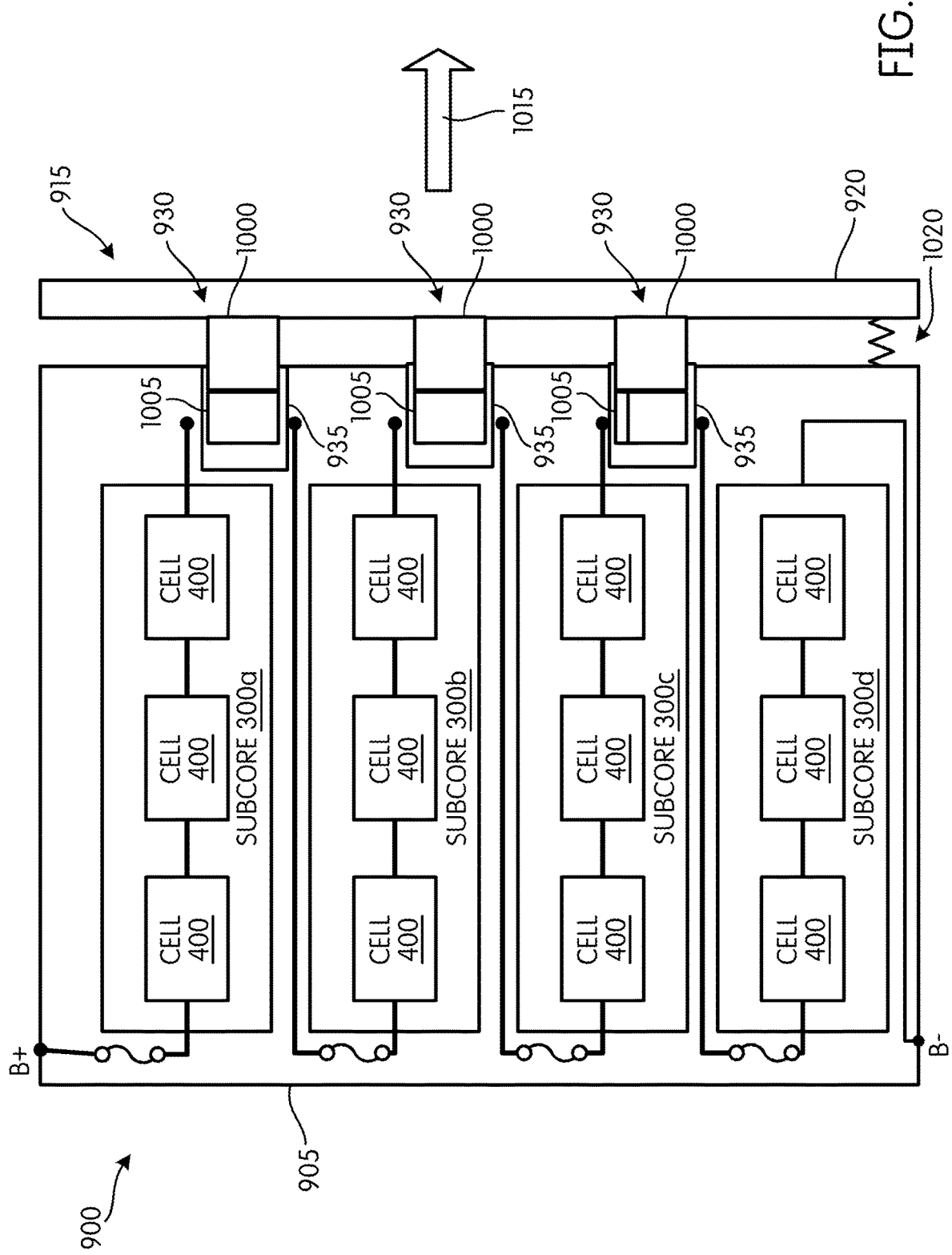
FIGS. 12A and 12B are block diagrams of the battery pack of FIG. 11, illustrating operation of the switch.
Figure 12B:
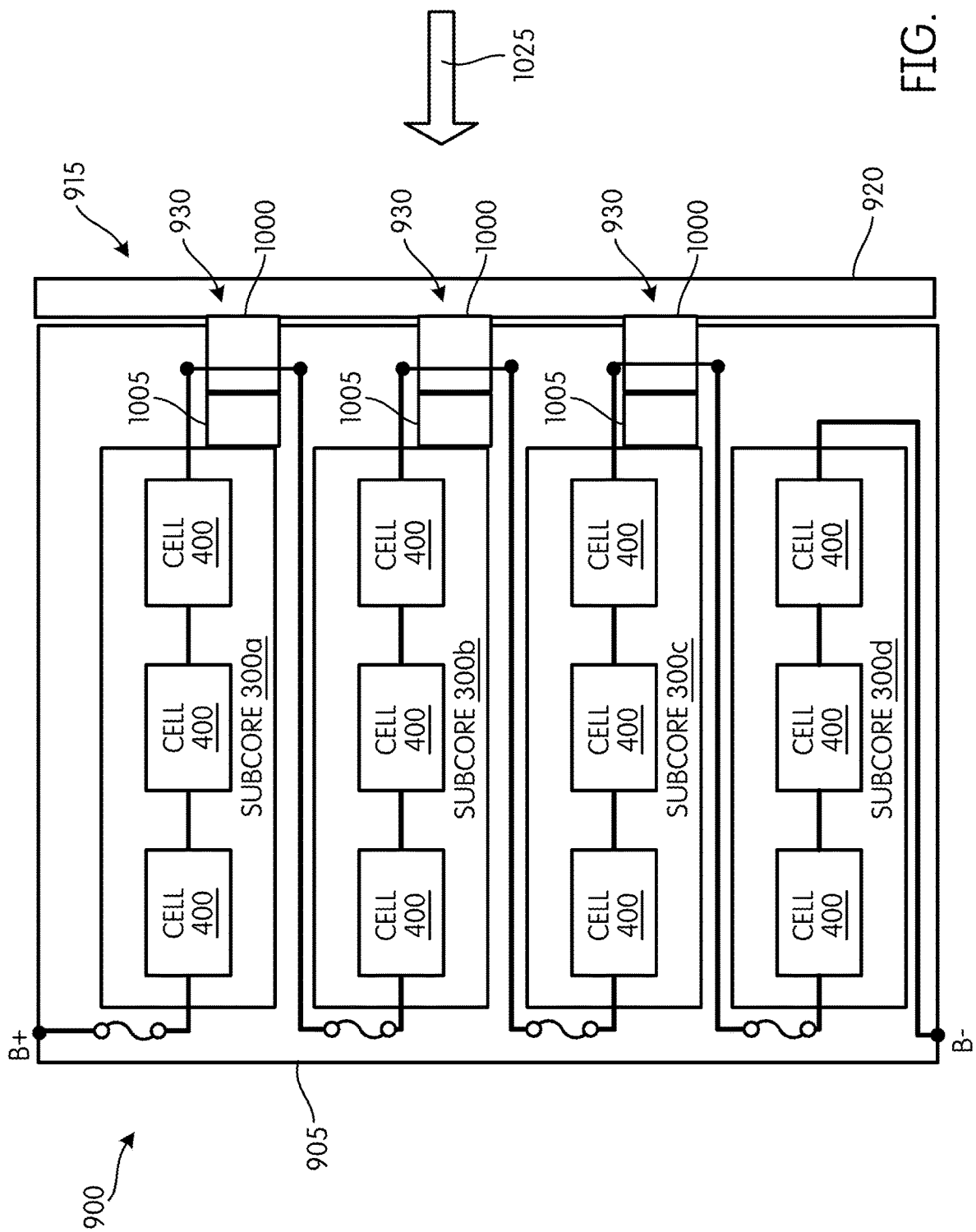

As further illustrated in FIGS. 12A and 12B, the plate 920 includes at least one male member or plunger 930 extending from the plate 920 (e.g., in a substantially perpendicular direction). The male member 930 is configured to be inserted into an aperture 935 defined by the housing 905. The male member 930 includes a conductive bus 1000 and a non-conductive portion 1005. The conductive bus 1000 is configured to electrically connect the subcores 300 in a series-type and/or a parallel-type configuration.

FIG. 12A illustrates the switch 915 in a first (e.g., "OFF") position. In the first position, the terminals of the subcores 300*a*-300*d* are in contact with the non-conductive portions 1005 of the male member 930 and, thus, are electrically disconnected from each other. In some embodiments, the plate 920 and, thereby, the male members 930 are biased in a first direction 1015. In such an embodiment, the plate 920 may be biased via a biasing member 1020, such as, but not limited to a spring.

FIG. 12B illustrates the switch 915 in a second (e.g., "ON") position. The plate 920 is manipulated by the user in a second direction 1025, opposite the first direction 1015, into the second position. In the second position, the terminals of the subcores 300*a*-300*d* are in contact with the conductive busses 1000 and, thus, electrically connected to each other.

Although illustrated as being in a series-type electrical connection, the subcores 300*a*-300*d* may be connected alternatively, or additionally, in a parallel-type configuration, such that the electrically connected the subcores 300*a*-300*d* and, thus, the battery pack 900, provide desired characteristics, such as a desired pack voltage, a desired pack current output, and a desired pack power capacity.

Figure 13:
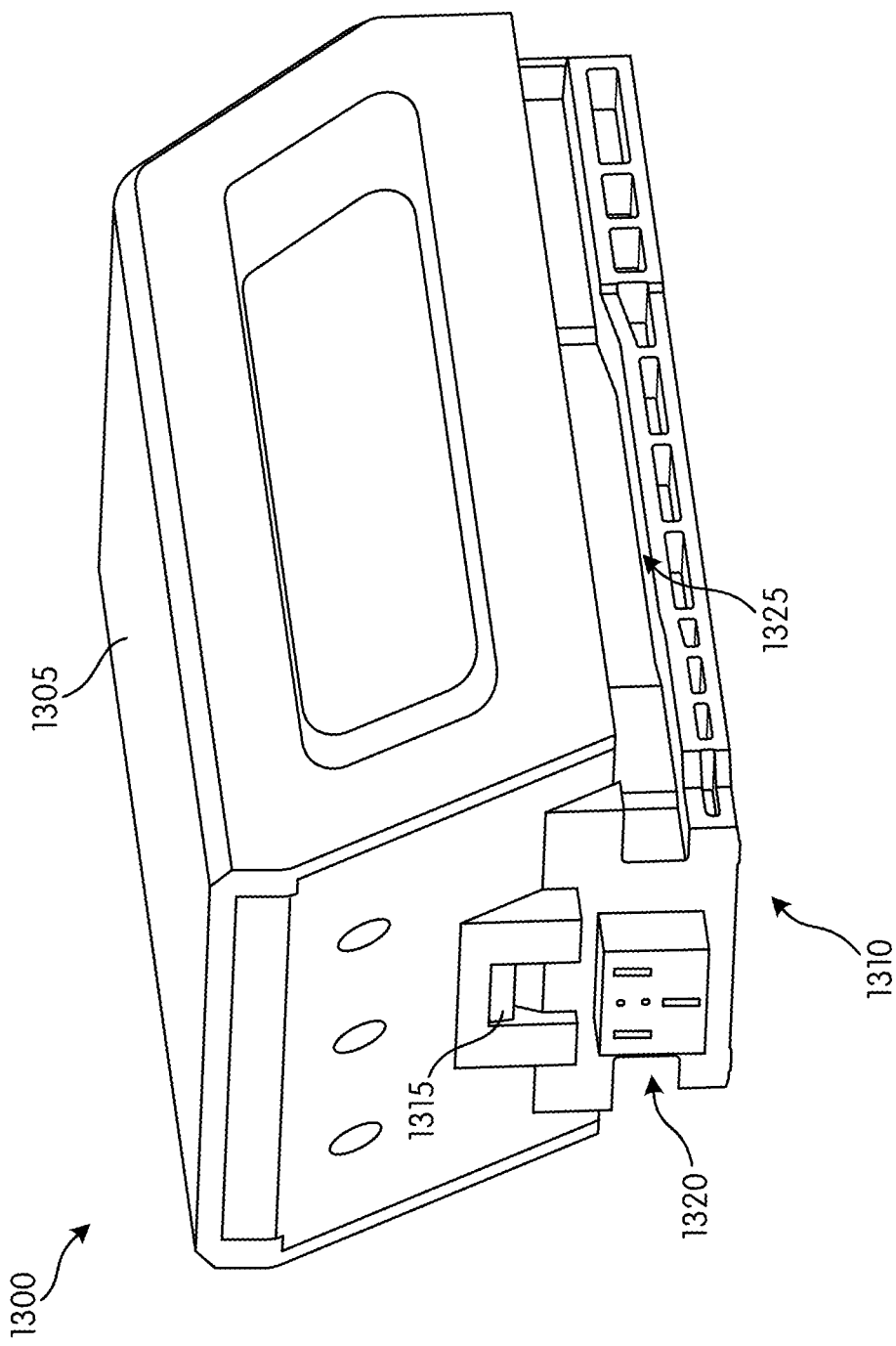
FIG. 13 is a perspective view of another alternative construction of a battery pack.

FIG. 13 illustrates a battery pack 1300 according to some embodiments of the application. The battery pack 1300 includes a housing 1305 having a battery pack interface 1310 and a switch 1315. The housing 1305 may be formed of similar materials as housing 200, discussed above. Additionally, the housing 1305 may contain battery modules 300 and battery cells 400, as discussed above. The battery pack interface 1310 is configured to electrically, via electrical interface 1320, and physically, via physical interface 1325, connect the battery pack 1300 to one or more devices 105. The electrical interface 1320 may include one or more positive terminals, one or more ground terminals, and one or communication terminals. Although illustrated as a rail and groove interface, in other embodiments, the physical interface 1325 may be a receptacle and stem interface.

Figure 14B:
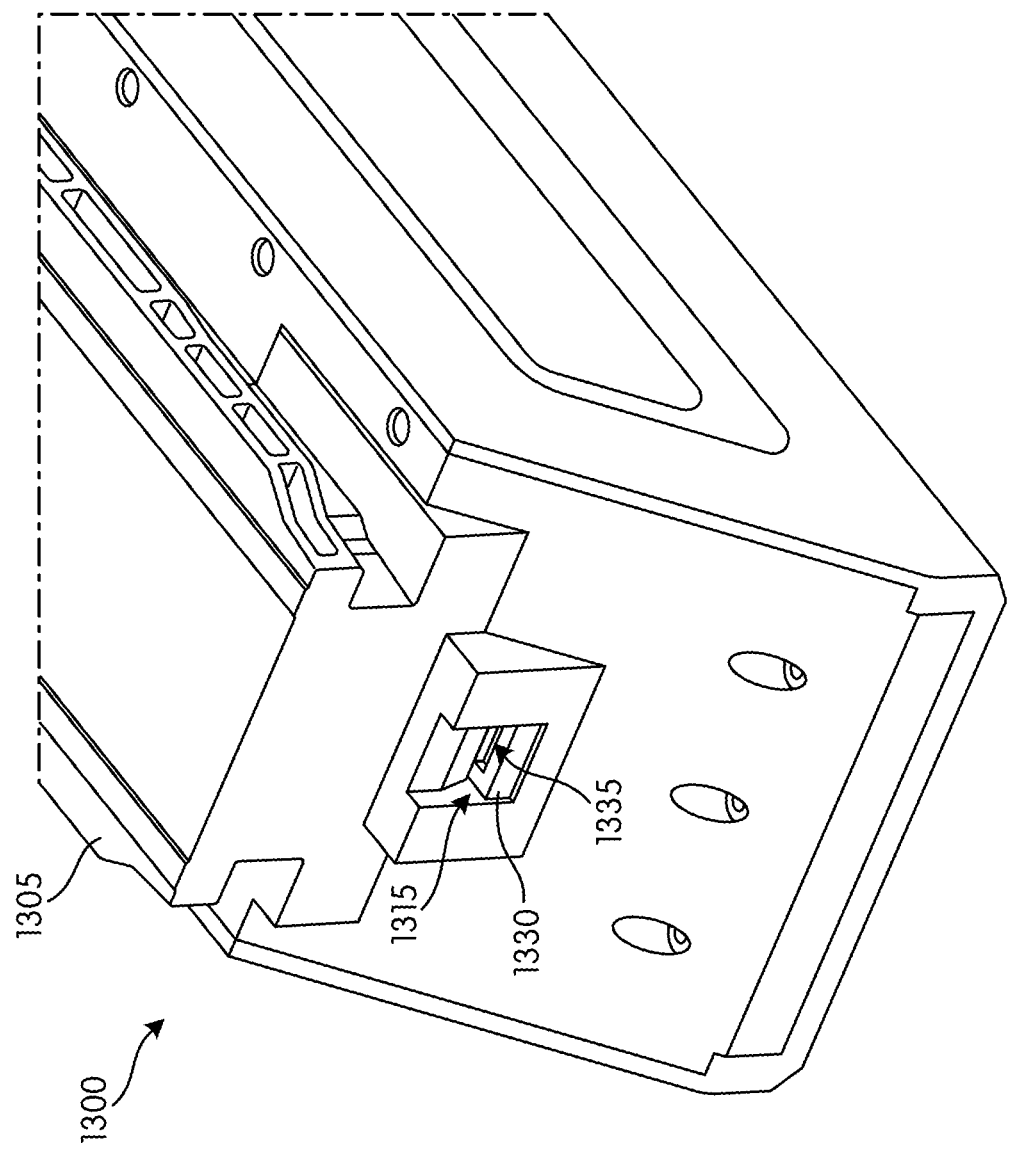

The switch 1315 includes a user-interface 1330 and is configured to be in a first position (FIG. 14A) and a second position (FIG. 14B). When in the first (e.g., "OFF") position, electrical components (for example, the subcores 300) of the battery pack 1300 contained within the housing 1305 are electrically disconnected from each other. When in the second (e.g., "ON") position, electrical components (for example, the subcores 300) are electrically connected to each other. The switch 1315 may be manipulated by a user from the first position to the second position by pressing the switch 1315. Additionally, the switch 1315 may be manipulated by an electrical device (e.g., a power tool and/or charger) when the battery pack is physically coupled to the electrical device.

As illustrated, in some embodiments the user-interface 1330 includes a slot, or aperture, 1335 formed by the switch

1315. In such an embodiment, the user may manipulate the switch 1315 from the second position to the first position by placing a variety of tools (for example, a flat head screw driver) into the slot 1335. In some embodiments, a stopper (for example, a zip-tie or other molded piece) may be placed, or positioned, within the slot 1335 to prevent the switch 1315 from moving from the first position to the second position.

In some embodiments, the battery pack 1300 further includes a latch configured to prevent accidental operation of the switch 1315. For example, in some embodiments, a user activates the latch before manipulating the switch 1315 from the first (e.g., "OFF") position to the second (e.g., "ON") position and/or from the second (e.g., "ON") position to the first (e.g., "OFF") position.

Figure 15A:
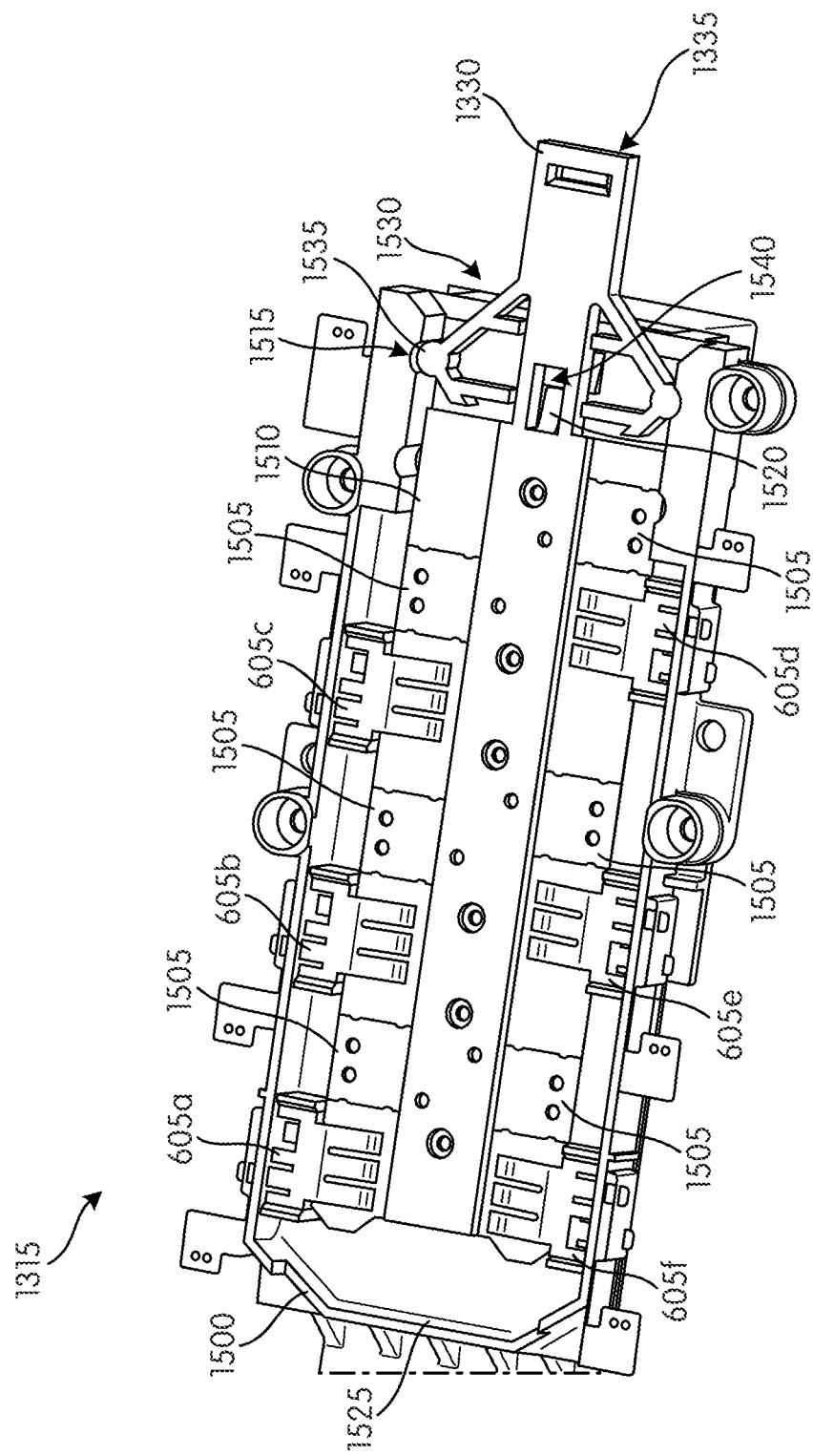
FIGS. 15A and 15B are perspective views a switch of the battery pack of FIG. 13, illustrating operation of the switch.
Figure 15B:
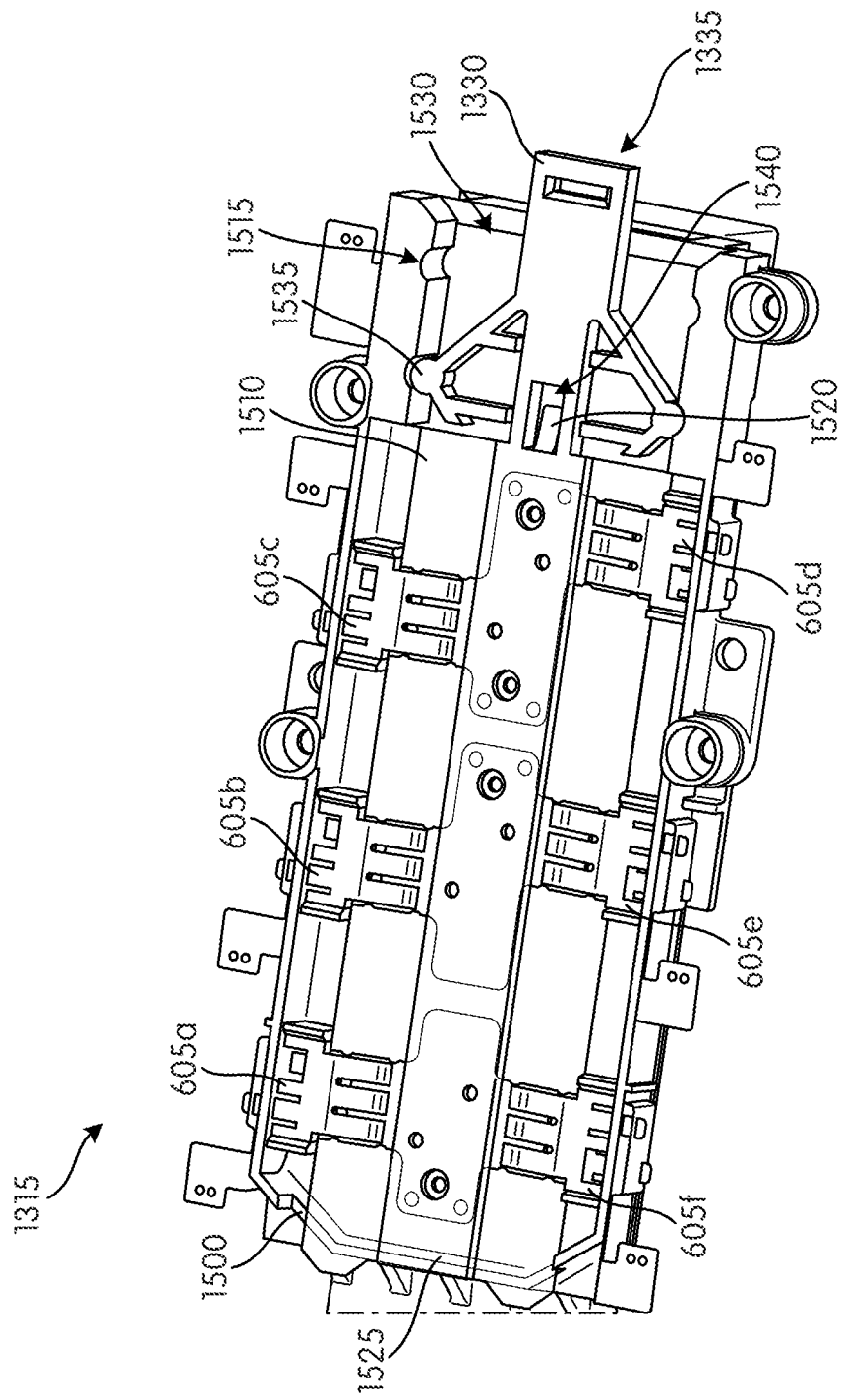

FIGS. 15A and 15B illustrates the switch 1315 according to another embodiment of the application. As discussed above, the switch 1315 is configured to be in the first position (FIGS. 14A & 15A) and the second position (FIGS. 14B & 15B). Switch 1315 includes a shell 1500, terminals 605a, 605b, 605c, . . . 605n, a conductive bus 1505, and a non-conductive layer 1510. Shell 1500 may be substantially similar to shell 600, the conductive bus 1505 may be substantially similar to conductive bus 610, and the non-conductive layer 1510 may be substantially similar to non-conductive layer 615. Shell 1500 may include one or more recesses 1515, a front stop member 1520, and a rear stop member 1525.

Figure 15C:
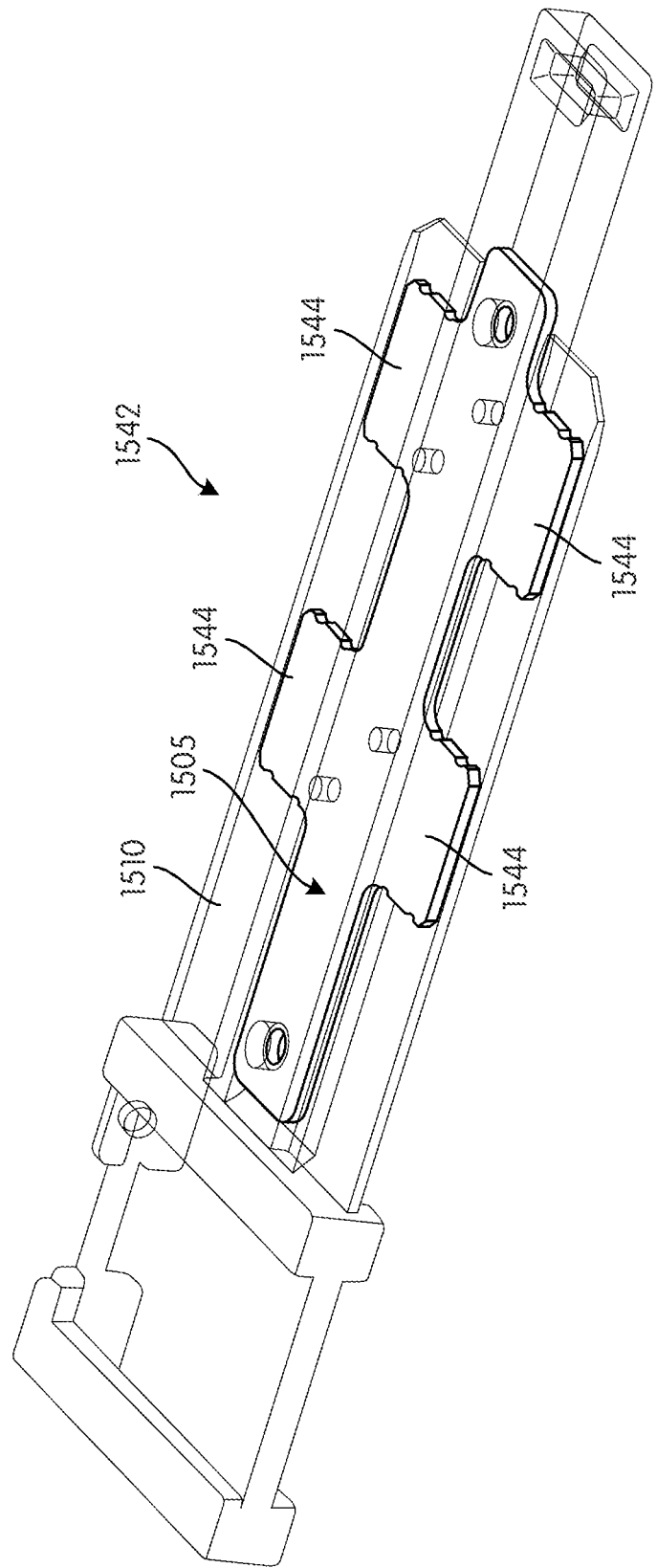
FIG. 15C is a perspective, partially exposed view of a plate of the switch of FIGS. 15A and 15B.

As illustrated in FIGS. 15A and 15B, in some embodiments, the conductive bus 1505 and non-conductive layer 1510 are coupled to the user-interface 1330 via a protective member 1530 having one or more projections 1535 and forming an aperture 1540. The projections 1535 engage with the one or more recesses 1515 of the shell 1500 to prevent unwanted movement between the first position and the second position. As illustrated in FIG. 15C the conductive bus 1505 and the non-conductive layer 1510 may form a plate 1542. As illustrated, in some embodiments, plate 1542 has a rectangular shape. However, in other embodiments, the plate 1542 may be formed into other shapes (for example, a square). Although illustrated as the conductive bus 1505 having four conductive members 1544, in other embodiments, the conductive bus 1505 may have more or less conductive member 1544.

In the illustrated embodiment of FIG. 15C, the conductive members 1544 are approximately flush, or continuous, with the non-conductive layer 1510. Such an embodiment promotes movement of the terminals 605 between connection to the non-conductive layer 1510 and connection to the conductive members 1544 of the conductive bus 1505. In some embodiments, as illustrated in FIG. 15C, the conductive bus 1505 is formed of a continuous conductive material (for example, copper).

Figure 15D:
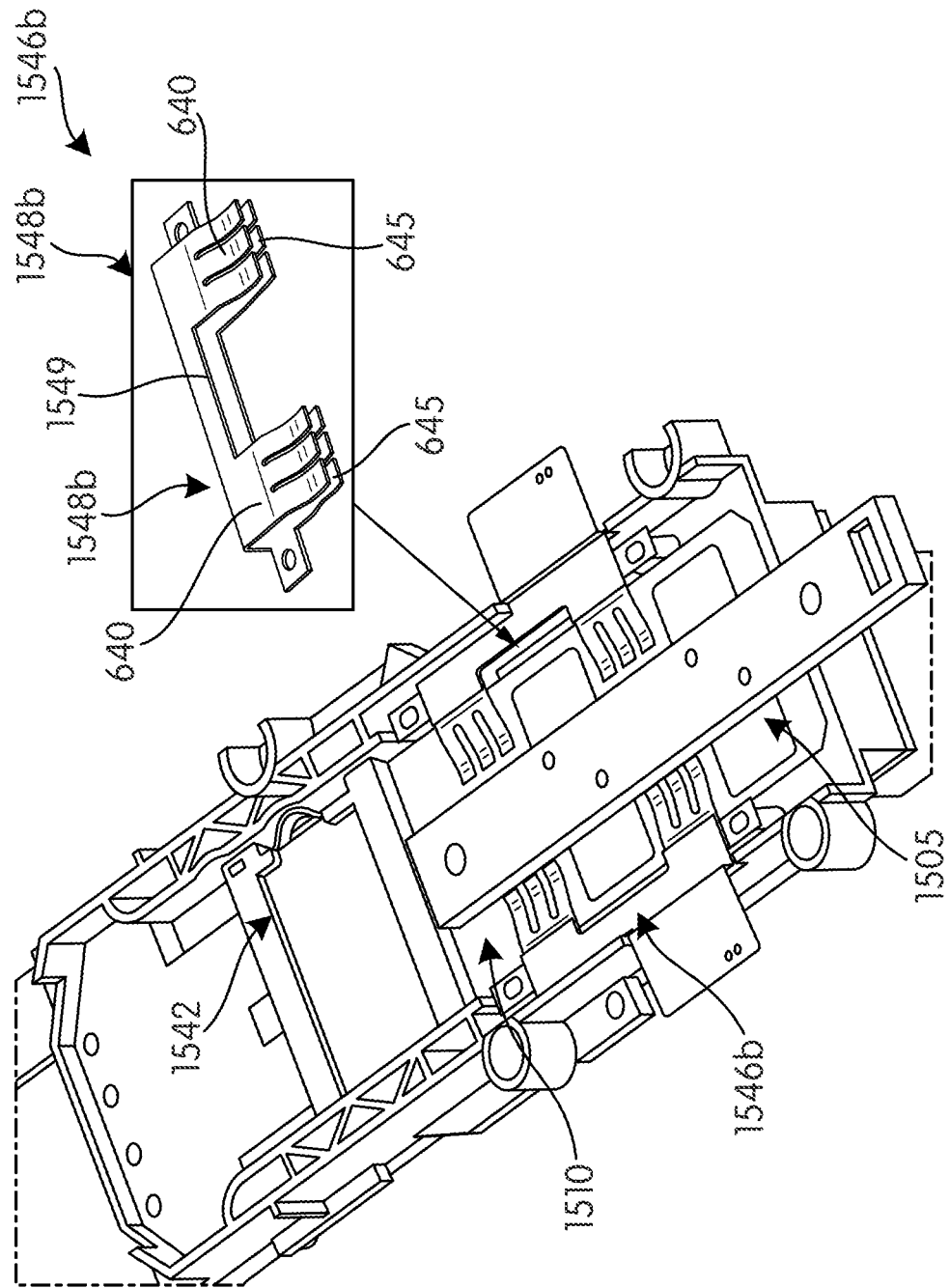
FIG. 15D is a perspective view of the plate of the switch of FIGS. 15A including a terminal.

FIG. 15D illustrates the conductive bus 1505 and non-conductive layer 1510 electrically and/or physically connected to terminals 1546a, 1546b according to another embodiment. Each illustrated terminal 1546 includes a first terminal portion 1548a and a second terminal portion 1548b connected via a bus bar 1549. In some embodiments, the bus bar 1549 provides a parallel connection between the terminal portions 1548a, 1548b, while reducing electrical resistance and heat generated via the connection of subcores. As illustrated, each terminal portion 1548 includes an upper foot 640 and a lower foot 645, which are substantially similar to the upper and lower feet 640, 645 of terminal 605. Terminals 1546, including bus bar 1549, allow for a single electrical connection between a first plurality of subcores (for example, subcores 300a, 300b) and a second plurality of subcores (for example, subcores 300c, 300d). In other embodiments, the terminal 1546 may include more than two terminal portions 1548.

Figure 16A:
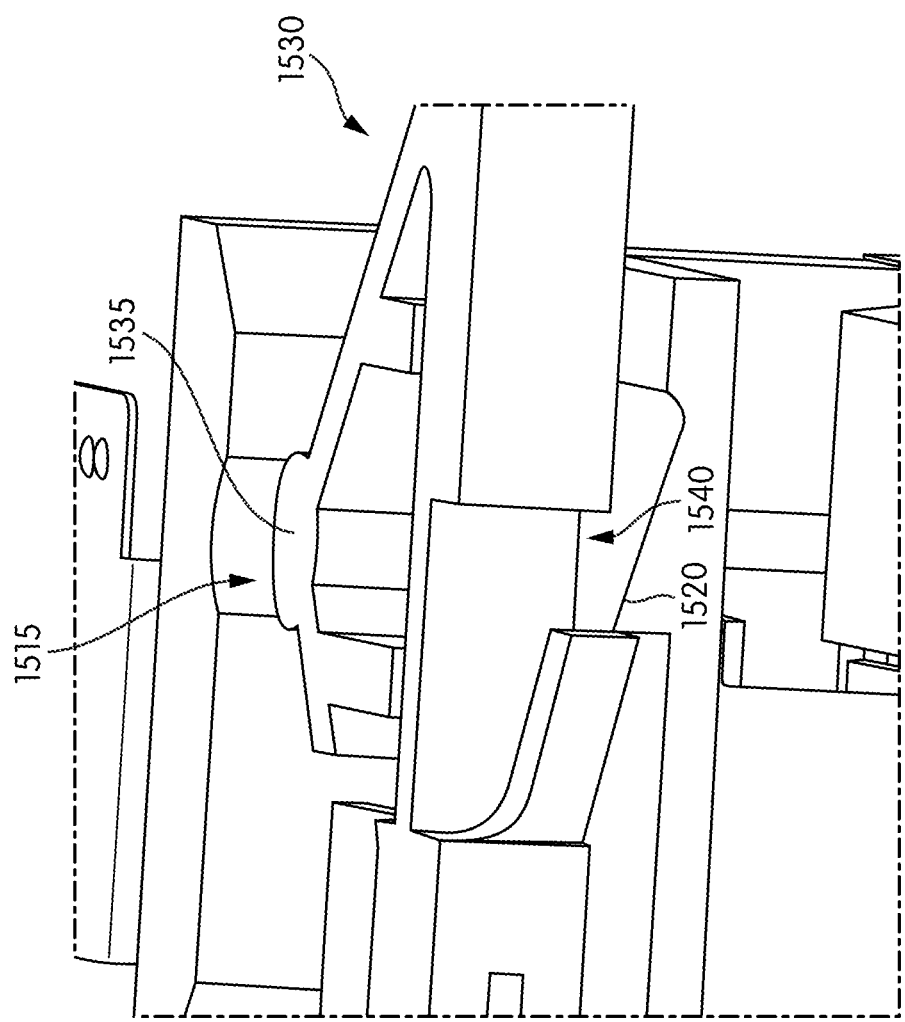
FIGS. 16A-16D illustrates views of a stop member of the switch of FIGS. 15A-15D.

As further illustrated in FIG. 16A, the front stop member 1520 is positioned within the aperture 1540 and engages the protective member 1530 to prevent the conductive bus 1505 and non-conductive layer 1510 from surpassing the first position, when moving from the second position to the first position.

Figure 16B:
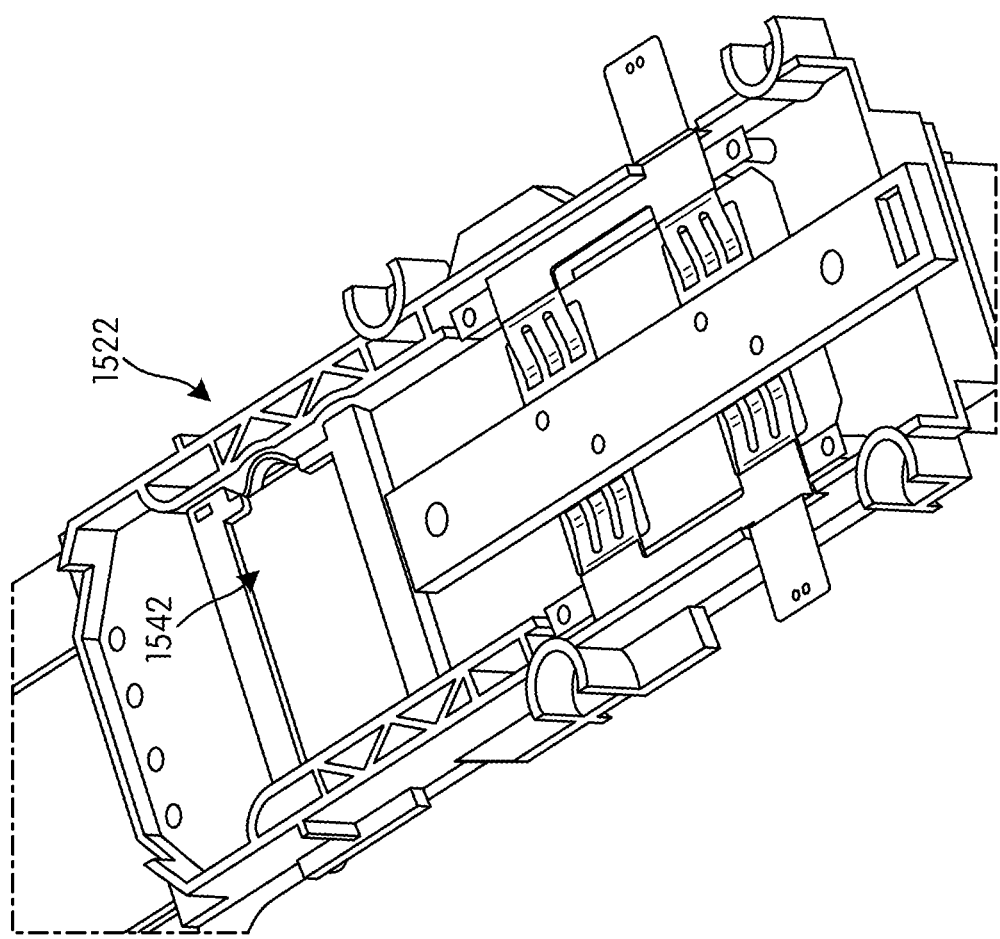
Figure 16D:
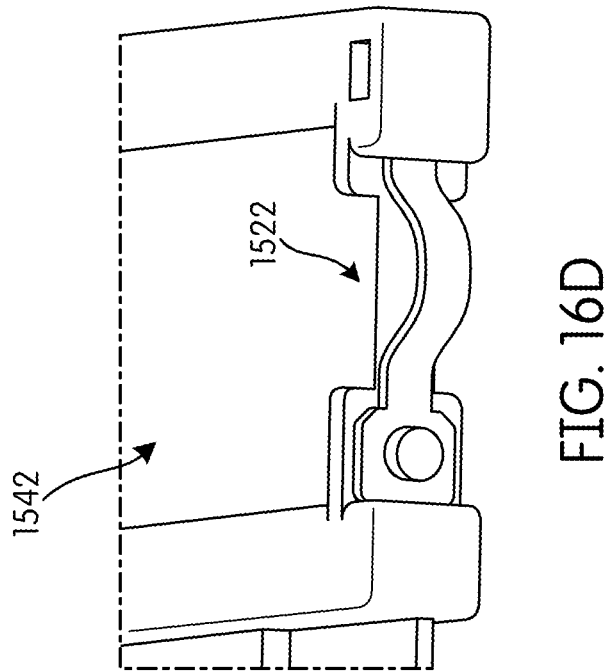
Figure 16C:
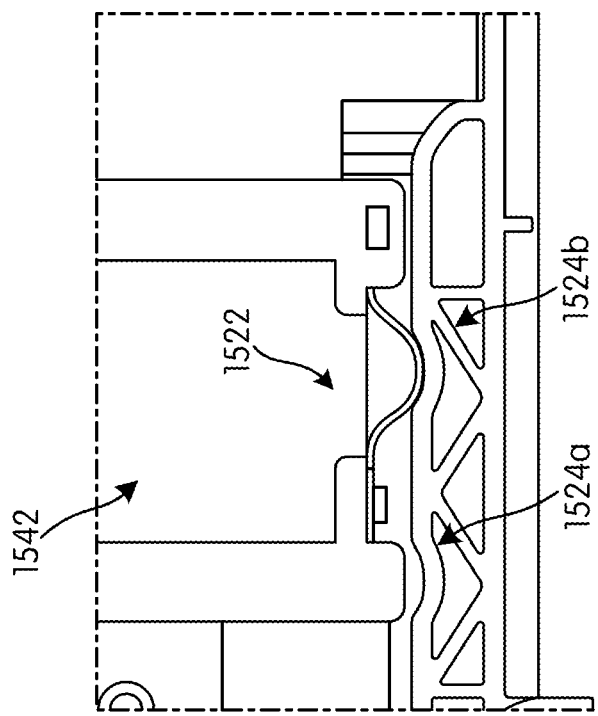

In another embodiment, as illustrated in FIGS. 16B-16D, the plate 1542 may include, in addition to or in lieu of front stop member 1520, a rear stop member 1522. Similar to front stop member 1520, the rear stop member 1522 may prevent the conductive bus 1505 and non-conductive layer 1510 from moving beyond the first position, when moving from the second position to the first position. In some embodiments, the rear stop member 1522 is formed of steel or a similar material. As illustrated in FIG. 16C, the rear stop member 1522 engages a first rear aperture 1524a, when in the first (e.g., "OFF") position, and a second rear aperture 1524b, when in the second (e.g., "ON") position. As illustrated in FIG. 16D, in some embodiments, the rear stop member 1522 may include a spring heat staked to the plate 1542.

Figure 17:
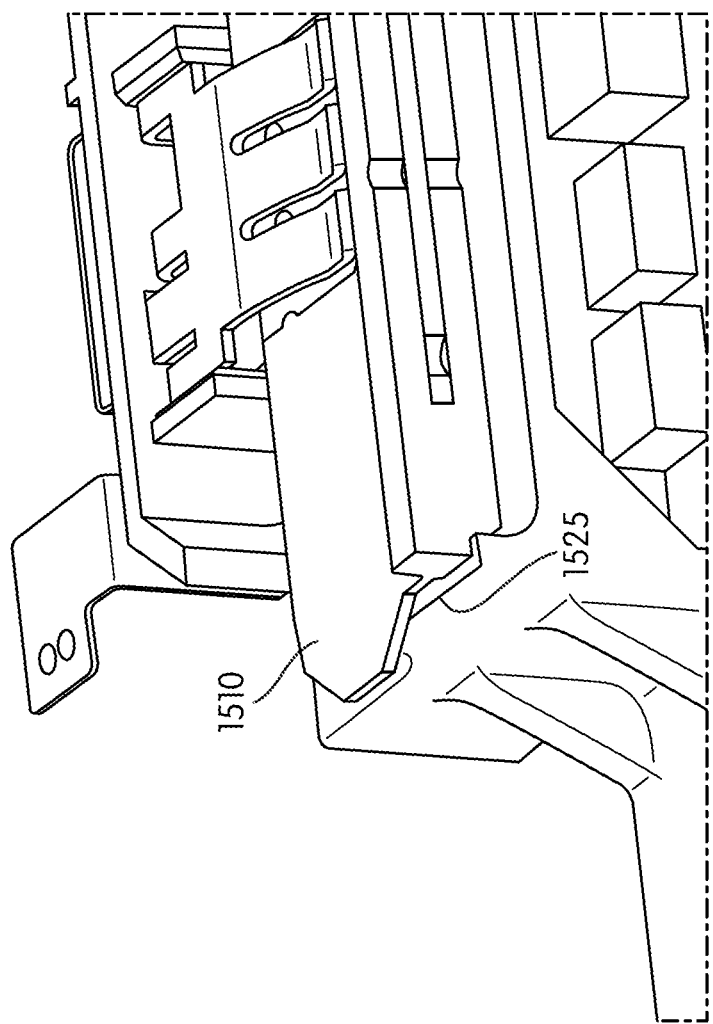
FIG. 17 is an enlarged view of the switch of FIGS. 15A and 15B.

As further illustrated in FIG. 17, the rear stop member 1525 prevents the conductive bus 1505 and non-conductive layer 1510 from surpassing the second position, when moving from the first position to the second position.

Figure 18:
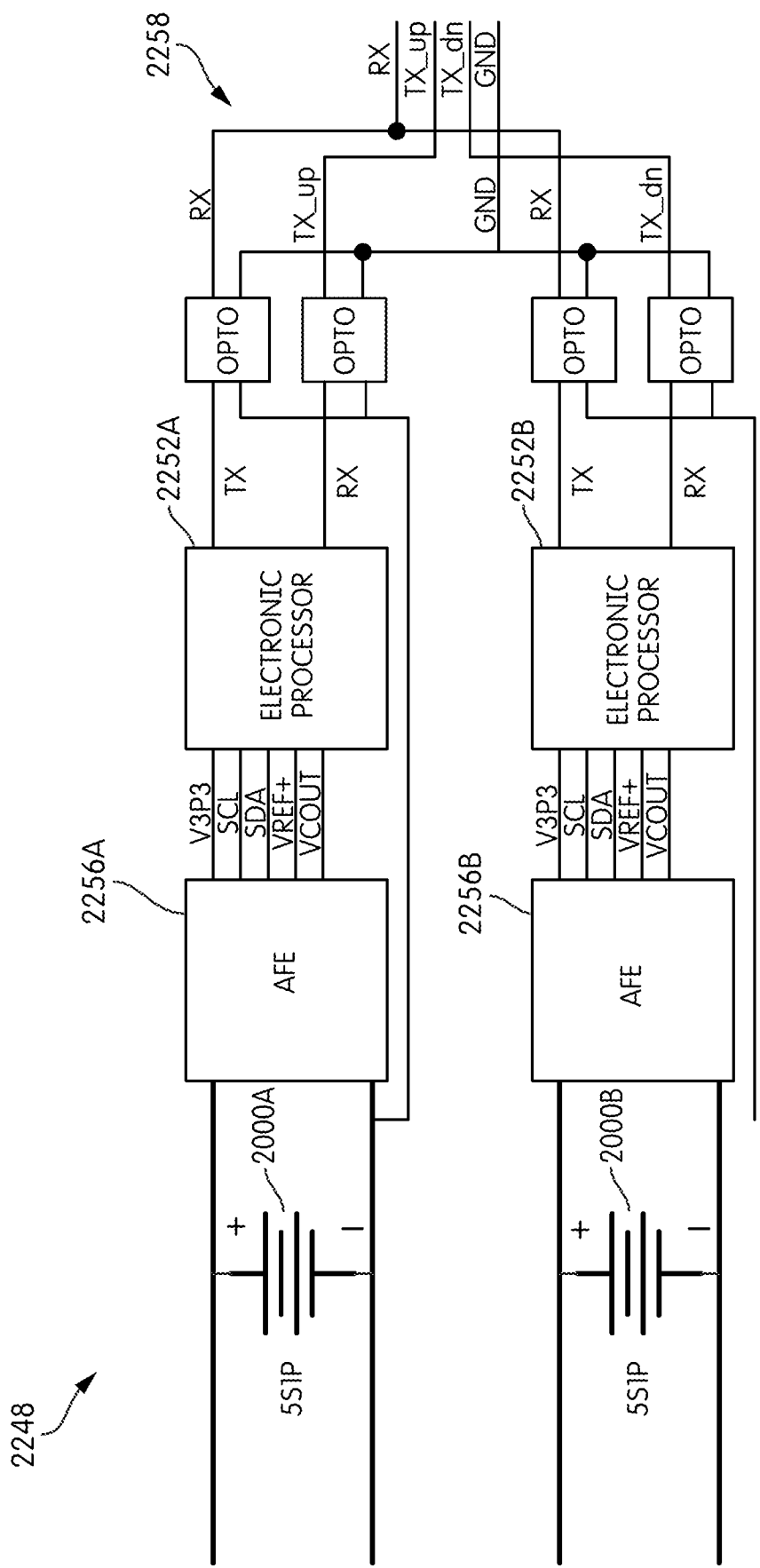
FIG. 18 is a block diagram of a battery monitoring circuit.

FIG. 18 illustrates an exemplary battery monitoring circuit 2248 of the battery pack 100. As illustrated, the battery monitoring circuit 2248 includes two 5S1P cell blocks 2000A and 2000B. Cell blocks 2000 may be substantially similar to subcores 300, discussed above. The cell block 2000A is monitored by an electronic processor 2252A using an analog front end (AFE) 2256A. The cell block 2000B is monitored by an electronic processor 2252B using an AFE 2256B.

The AFEs 2256A-B are capable of monitoring individual cells in the cell blocks 2000A-B. The AFEs 2256A-B may be implemented using, for example, BQ76925 host-controlled analog front end designed by Texas Instruments. The AFEs 2256A-B may be referred to singularly as the AFE 2256, and the processors 2252A-B may be referred to singularly as the processor 2252. In other embodiments, the battery monitoring circuit 2248 may include more or fewer cell blocks 2000 monitored by more or fewer processors 2252 and AFEs 2256.

The AFE 2256 provides operating power to the processor 2252 over the V3P3 line. The processor 2252 provides serial clock (SCL) to the AFE 2256 over the SCL line. The processor 2252 and the AFE 2256 exchange serial data over the SDA line. For example, the processor 2252 may write an address of an individual cell to be monitored at a given time to a register of the AFE 2256 over the SDA line. The AFE 2256 provides a reference voltage used to measure individual voltages of the cells 400 over the VREF+ line to the processor 2252. The AFE 2256 provides individual states (for example, voltages of individual cells 400) over the VCOUT line to the processor 2252. The AFE 2256 may provide a voltage of a particular cell 400 at the VCOUT line based on request written to the AFE 2256 over the SDA line. The battery monitoring circuit 2248 may additionally include a coupling circuit, for example, an opto-coupling circuit 2258 that facilitates communication between the processors 2252A-B and an electronic processor of a tool.

Figure 19:
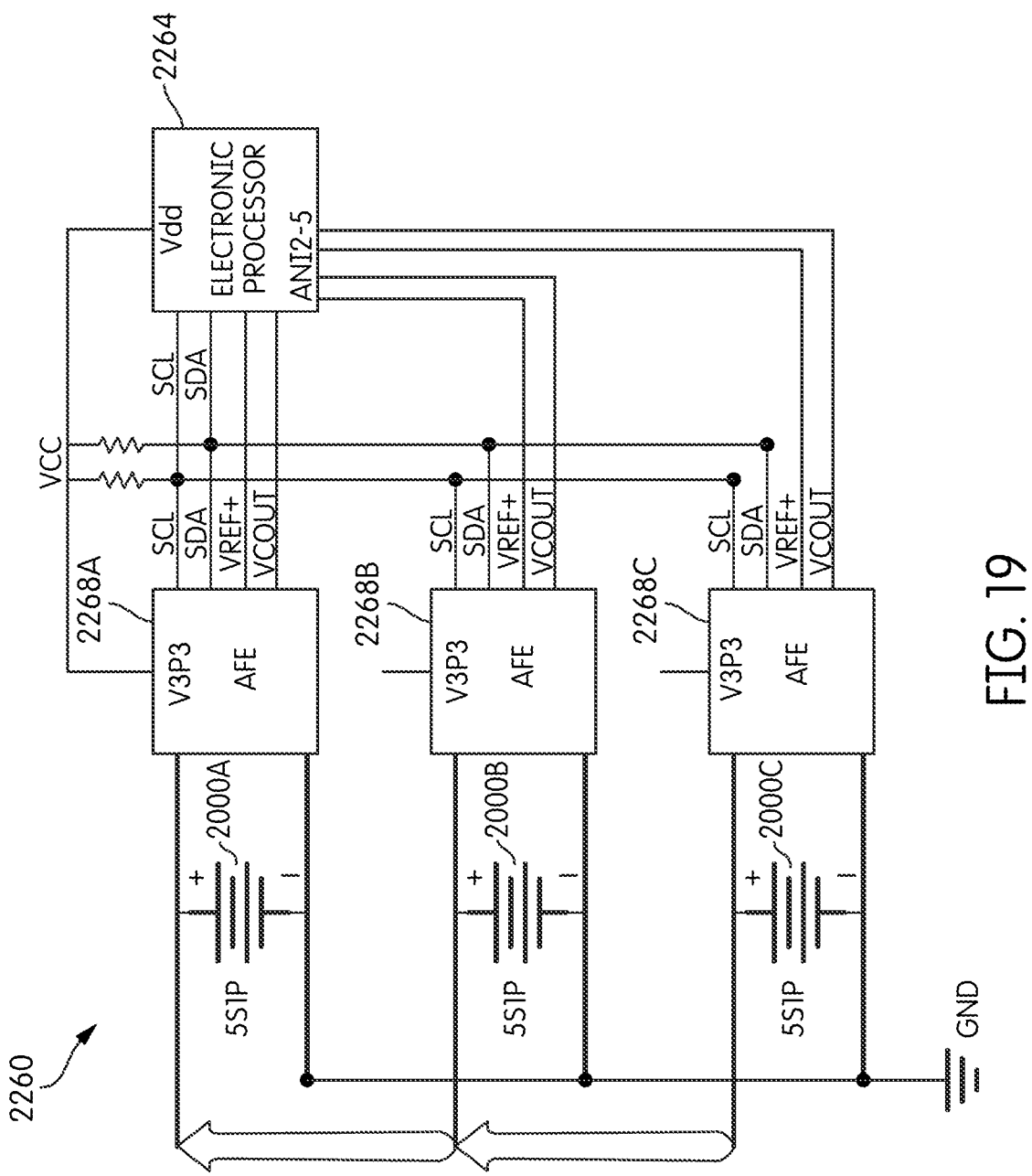
FIG. 19 is a block diagram of an alternative battery monitoring circuit.

FIG. 19 illustrates a further alternative battery monitoring circuit 2260. As illustrated, the battery monitoring circuit 2260 includes three 5S1P cell blocks 2000A-C. Each cell block 2000A-C is monitored by a single electronic processor 2264 using AFEs 2268A-C, respectively. As described above, the AFEs 2268A-C are capable of monitoring individual cells 400 in the cell blocks 2000A-C. The AFEs 2268A-C may be referred to singularly as the AFE 2268. In other embodiments, the battery monitoring circuit 2248 may include more or fewer cell blocks 2000 monitored by the processor 2264 using more or fewer AFEs 2268.

The processor 2264 may receive operating power from one of the AFEs 2268. The processor 2264 provides a serial clock over the SCL lines to the AFEs 2268A-C. In addition, the processor 2264 and the AFEs 2268A-C exchange serial data over the SDA lines. The processor 2264 may receive reference voltages (VREF+) and individual cell states (VCOUT) at analog inputs ANI0-5. In the illustrated example, analog inputs ANI0-1 are connected to AFE 2268A, analog inputs ANI2-3 are connected to AFE 2268B, and analog inputs ANI4-5 are connected to AFE 2268C.

Figure 20:
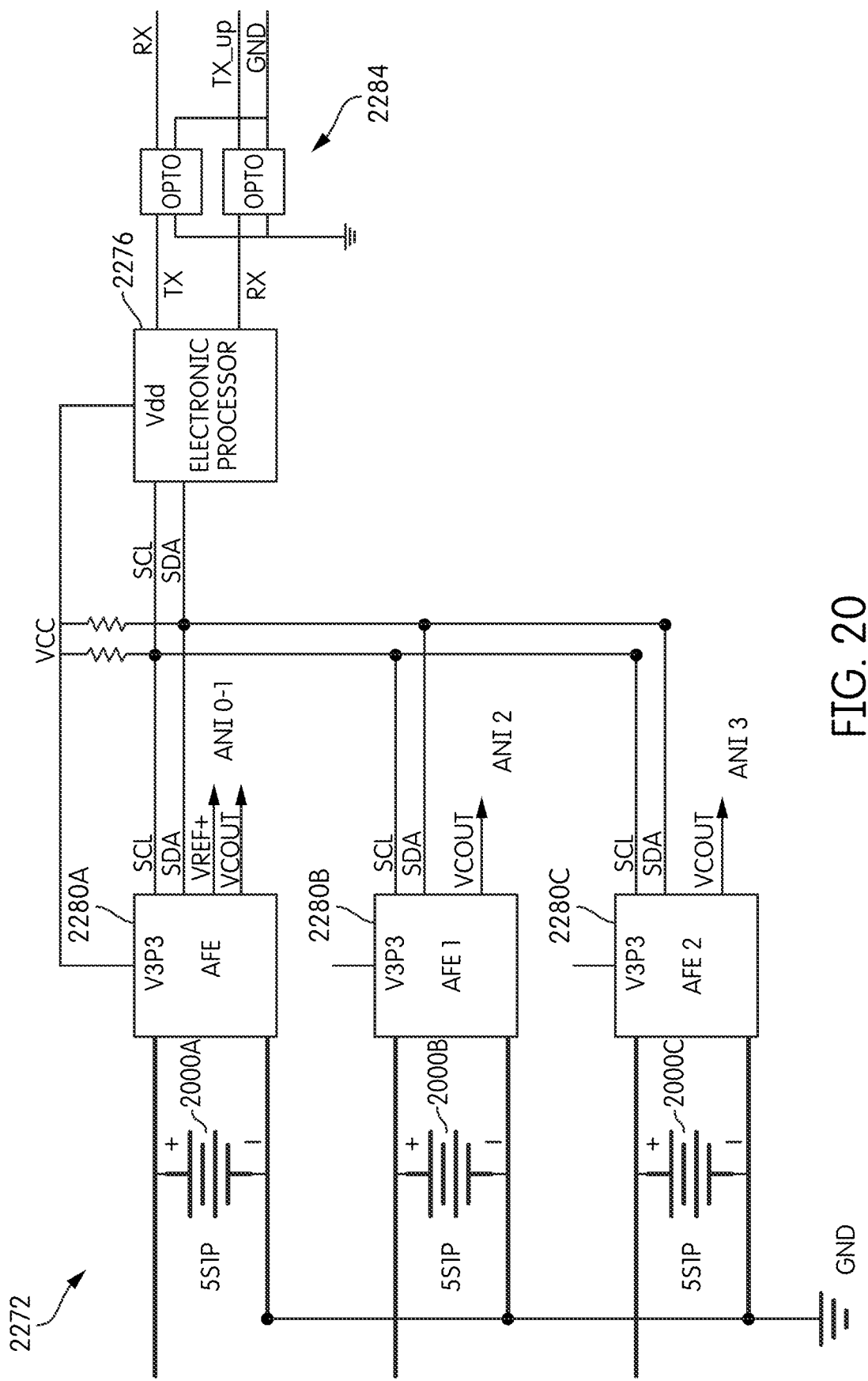
FIG. 20 is a block diagram of a battery monitoring circuit using shared inter-integrated circuit bus.

FIG. 20 illustrates another alternative battery monitoring circuit 2272 using shared inter-integrated circuit (I2C) bus. As illustrated, the battery monitoring circuit 2272 includes three 5S1P cell blocks 2000A-C monitored by a single electronic processor 2276 using AFEs 2280A-C, respectively. The battery monitoring circuit 2272 operates in a similar manner to the battery monitoring circuit 2260 of FIG. 19.

The AFEs 2280A-C communicate with the processor 2276 over a shared I2C channel. Outputs of the AFEs 2280A-C are provided at analog inputs ANI0-3 of the processor 2276. Because all cells 400 in the cell blocks 2000A-C operate at similar voltage levels, the processor 2276 may be provided with a single reference voltage (VREF+) from the AFE 2280A. The reference voltage VREF+ is provided at the analog input ANI0. States of individual cells (VCOUT) are provided at analog inputs ANI1-3 from the AFEs 2280A-C, respectively. The battery monitoring circuit 2272 may include more or fewer cell blocks 2000 monitored by the processor 2276 using more of fewer AFEs 2280 over the shared I2C channel. The battery monitoring circuit 2272 may also include an opto-coupling circuit 2284.

Figure 21A:
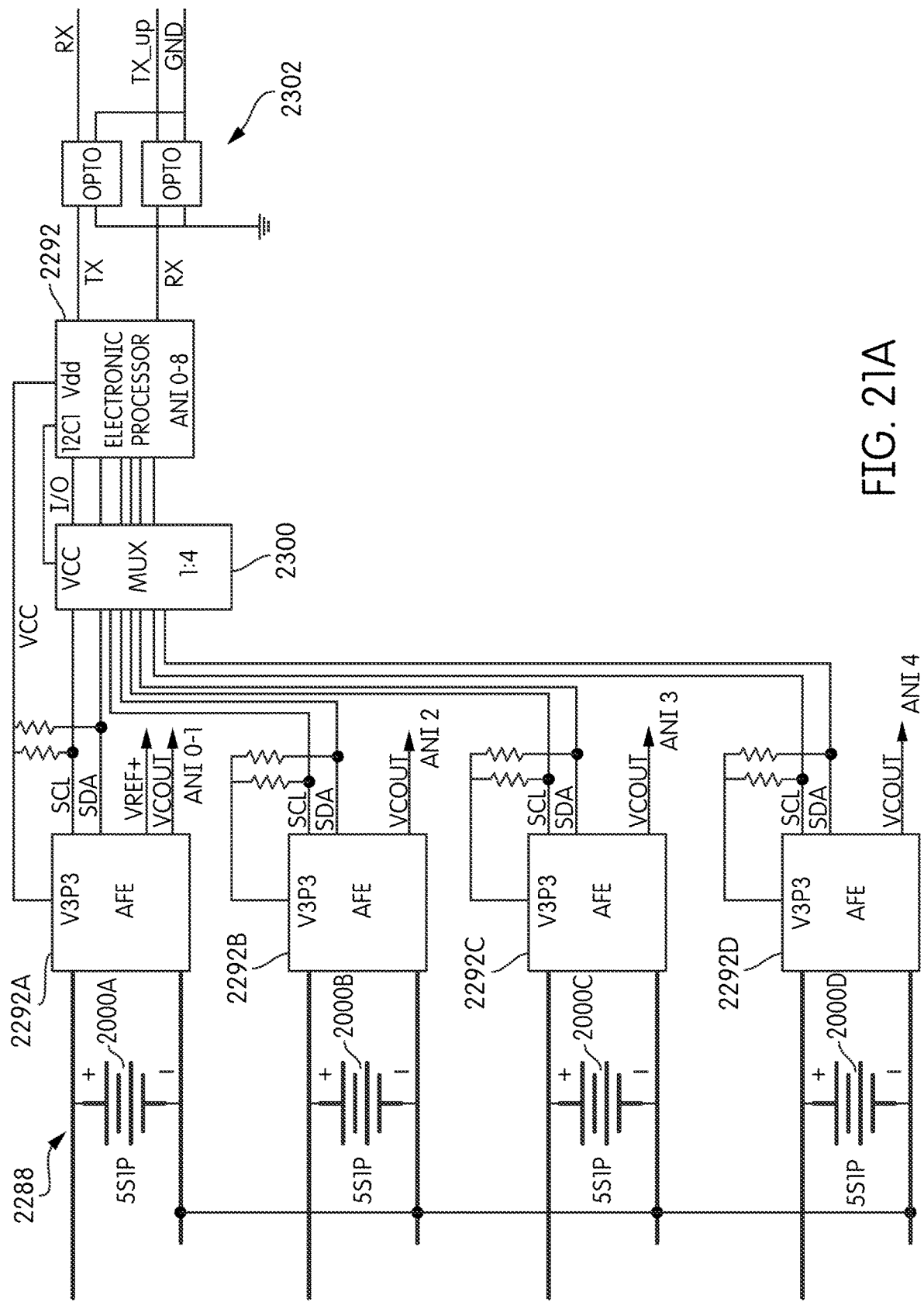
FIGS. 21A-21B are block diagrams of a battery monitoring circuit using multiplexors and a shared inter-integrated circuit bus.
Figure 21B:
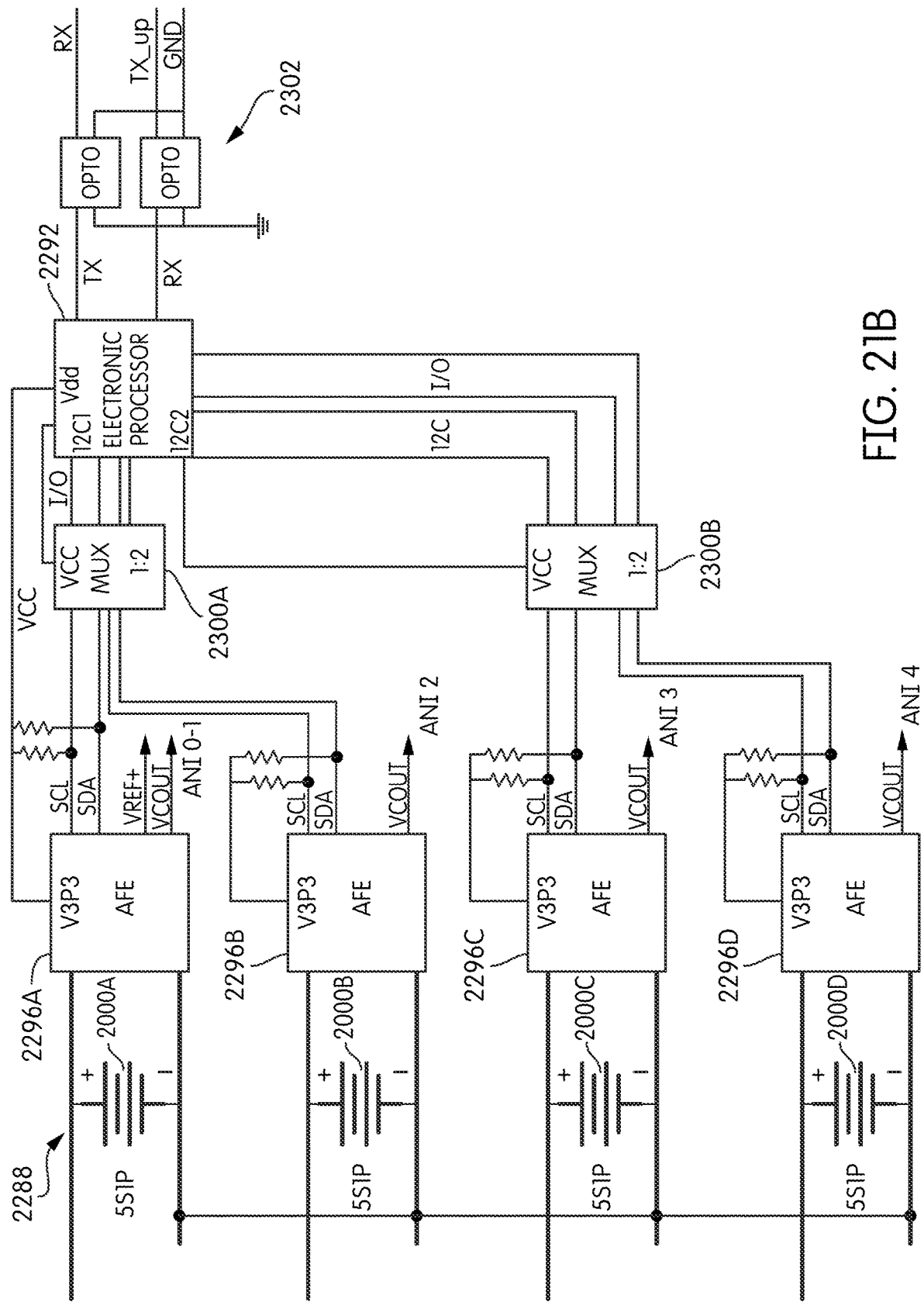

FIG. 21A-B illustrate yet another alternative battery monitoring circuit 2288 using multiplexors. As illustrated, the battery monitoring circuit 2288 includes four 5S1P cell blocks 2000A-D monitored by a single electronic processor 2292 using AFEs 2296A-D. The battery monitoring circuit 2288 operates in a manner similar to the battery monitoring circuit 2272 of FIG. 20.

The AFEs 2296A-D communicate with the processor 2292 over a shared I2C channel. As shown in FIG. 21A, a multiplexor 2300 is connected between the processor 2292 and the AFEs 2296A-D on the shared I2C channel. The processor 2292 provides selection inputs to the multiplexor 2300 in order to select an AFE 2296 between the 2296A-D with which the processor 2292 exchanges communications at a particular time. As shown in FIG. 21B, multiple multiplexors 2300A-B may also be used over multiple I2C channels to facilitate communications between the processor 2292 and the AFEs 2296A-D. The battery monitoring circuit 2288 may also include an opto-coupling circuit 2302.

Figure 22:
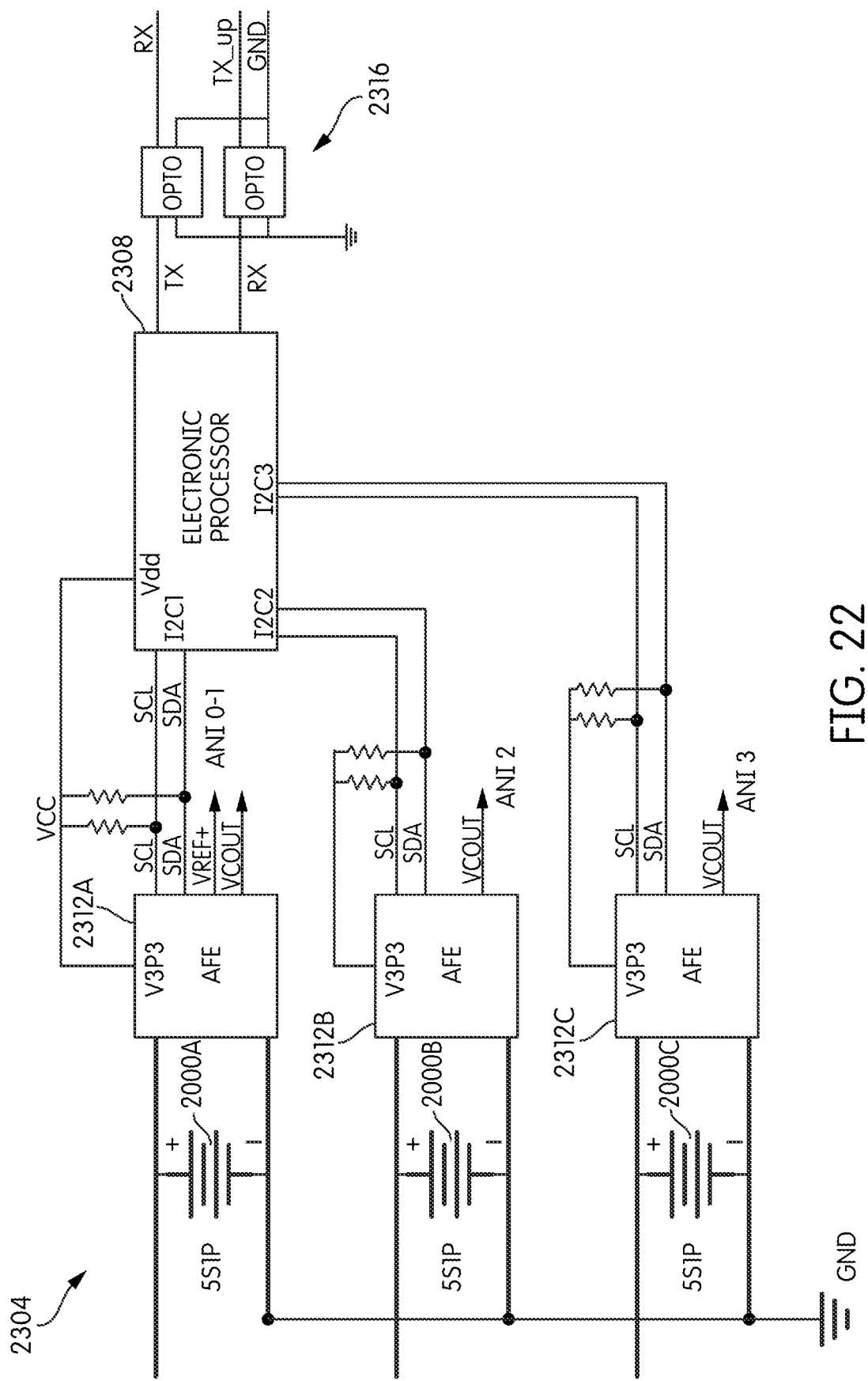
FIG. 22 is a block diagram of a battery monitoring circuit using multiple inter-integrated circuit buses.

FIG. 22 illustrates a further alternative battery monitoring circuit 2304 using multiple inter-integrated circuit (I2C) buses. As illustrated, the battery monitoring circuit 2304 includes three 5S1P cell blocks 2000A-C monitored by a single electronic processor 308 using AFEs 2312A-C respectively. The battery monitoring circuit 2304 operates in a manner similar to the battery monitoring circuit 2272 of FIG. 20. However, the AFEs 2312A-C communicate with the processor 2308 over multiple I2C channels.

For example, the AFE 2312A communicates with the processor 2308 over I2C channel I2C 1, the AFE 2312B communicates with the processor 2308 over I2C channel I2C 2, and so on. Outputs of the AFEs 2312A-C are provided at analog inputs ANI0-3 of the processor 2308 similar to the battery monitoring circuit 2272 of FIG. 20. The battery monitoring circuit 2304 may include more or fewer cell blocks 2000 monitored by the processor 2308 using more or fewer AFEs 2312 over multiple I2C channels. The battery monitoring circuit 2304 may also include an opto-coupling circuit 2316.

Figure 23:
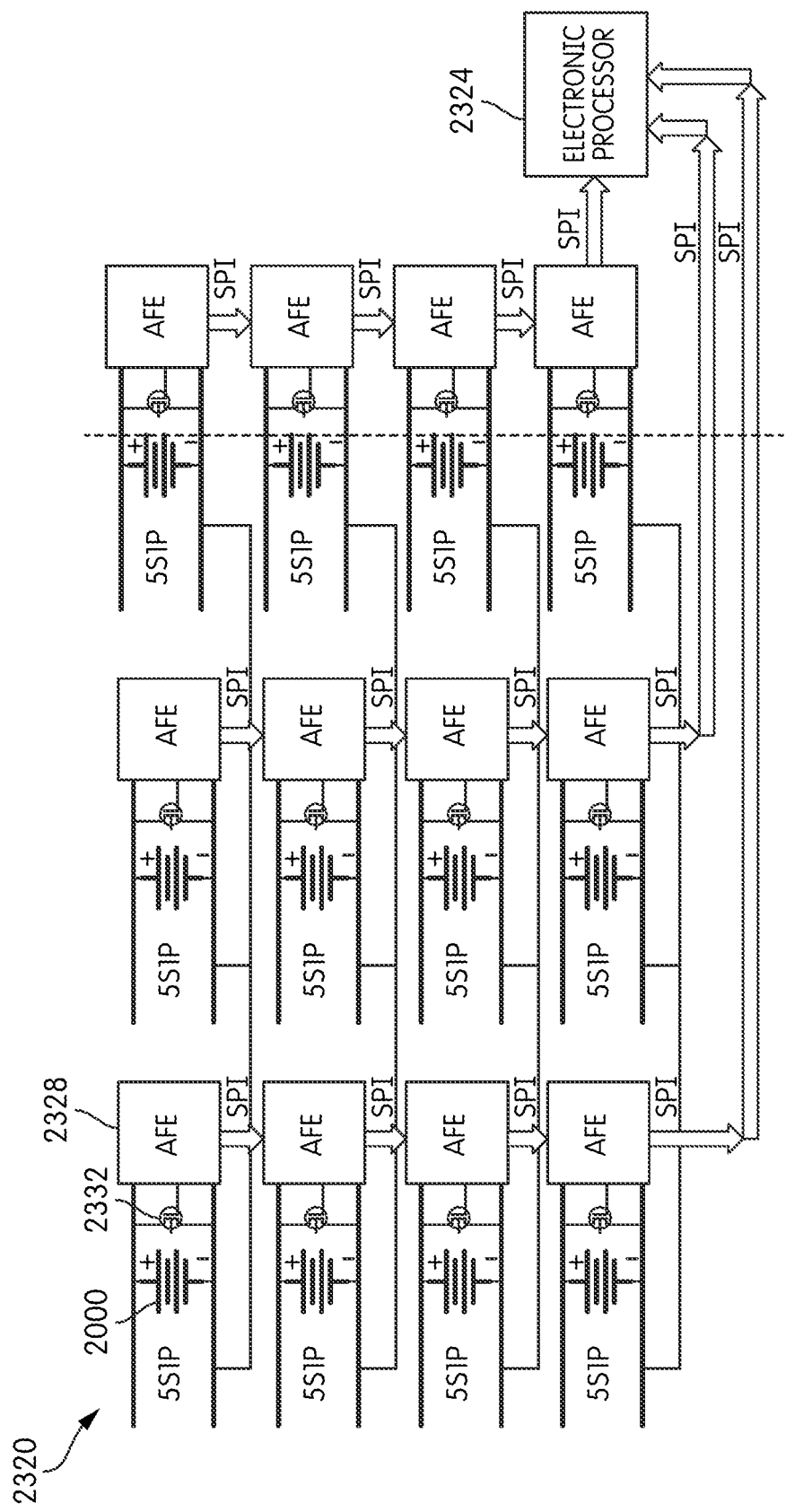
FIG. 23 is a block diagram of a battery monitoring circuit using a serial peripheral interface.

FIG. 23 illustrates another alternative battery monitoring circuit 2320 using serial peripheral interface. As illustrated, several 5S1P block 2000 are monitored by a single electronic processor 2324 using several AFEs 2328. The AFEs 2328 communicate with the processor 2324 using serial peripheral interface bus. The battery monitoring circuit 2320 may also include several switches 2332 with resistors connected across each cell block 2000 to discharge the cell blocks 2000 during cell balancing.

Thus, the application may provide, among other things, a system and method for electrically connecting and disconnecting a plurality of battery cells in a battery pack.

What is claimed is:

1. A battery pack comprising:
a housing defining an aperture;
a first battery cell within the housing, the first battery cell being electrically connected to a first terminal;
a second battery cell within the housing, the second battery cell being electrically connected to a second terminal, at least one of the first terminal and the second terminal including a terminal portion having an upper foot and a lower foot; and
a switch configured to be in a first position and a second position, the switch including an interface extending through the aperture for moving the switch from the first position to the second position, the terminal portion, and a plate located within the housing, the plate including:
a conductive portion of the plate composed of a conductive material configured to electrically connect the first terminal to the second terminal when the switch is in the first position, and
a non-conductive portion of the plate composed of a non-conductive material configured to be positioned between the upper foot and the lower foot to galvanically isolate the first terminal from the second terminal when the switch is in the second position;
wherein the terminal portion is configured to electrically connect the first terminal to the second terminal when the conductive portion is between the upper foot and the lower foot;
wherein the battery pack is configured to electrically and mechanically connect to a power tool; and
wherein the interface interacts with the power tool upon mechanical connection such that the switch moves from the second position to the first position.

2. The battery pack of claim 1, wherein the upper foot and the lower foot are configured to engage the conductive portion in the first position of the switch and the non-conductive portion in the second position of the switch.

3. The battery pack of claim 1, wherein the conductive portion provides a parallel connection between the first terminal and the second terminal.

4. The battery pack of claim 1, wherein the first battery cell is included in a first subcore and the second battery cell is included in a second subcore.

5. A battery pack comprising:
a housing defining an aperture;
a first battery cell within the housing, the first battery cell being electrically connected to a first terminal;
a second battery cell within the housing, the second battery cell being electrically connected to a second terminal;
a switch configured to be in a first position and a second position, the switch including an interface extending through the aperture for moving the switch from the first position to the second position, and a plate located within the housing, the plate including:
a conductive portion of the plate composed of a conductive material configured to electrically connect the first terminal to the second terminal when the switch is in the first position, and
a non-conductive portion of the plate composed of a non-conductive material configured to galvanically isolate the first terminal from the second terminal when the switch is in the second position; and
a latch configured to be activated before the switch is moved between the first position and the second position;
wherein an upper foot of the first terminal and a lower foot of the first terminal are electrically connected to the first battery cell when the switch is in the first position;
wherein the battery pack is configured to electrically and mechanically connect to a power tool; and
wherein the interface interacts with the power tool upon mechanical connection such that the switch moves from the second position to the first position.

6. The battery pack of claim 5, wherein the second terminal includes an upper foot and a lower foot, wherein the upper foot of the first terminal is biased toward the lower foot of the first terminal, and wherein the upper foot of the second terminal is biased toward the lower foot of the second terminal.

7. The battery pack of claim 6, wherein the upper foot of the first terminal and the lower foot of the first terminal are configured to engage the conductive portion in the first position of the switch and the non-conductive portion in the second position of the switch.

8. The battery pack of claim 5, wherein the first and second terminals each include a first terminal portion connected to a second terminal portion.

9. A battery pack comprising:
a housing defining an aperture;
a first battery cell within the housing, the first battery cell being electrically connected to a first terminal;
a second battery cell within the housing, the second battery cell being electrically connected to a second terminal, at least one of the first terminal and the second terminal including a terminal portion having an upper foot and a lower foot; and
a switch configured to be in a first position and a second position, the switch including an interface extending through the aperture for moving the switch from the first position to the second position, the terminal portion, and a plate located within the housing, the plate including:
a conductive portion of the plate composed of a conductive material configured to electrically connect the first terminal to the second terminal when the switch is in the first position, and
a non-conductive portion of the plate composed of a non-conductive material configured to be positioned between the upper foot and the lower foot to galvanically isolate the first terminal from the second terminal when the switch is in the second position;
wherein the terminal portion is configured to electrically connect the first terminal to the second terminal when the conductive portion is between the upper foot and the lower foot; and
wherein the conductive portion provides a parallel connection between the first terminal and the second terminal.

10. The battery pack of claim 9, wherein the upper foot and the lower foot are configured to engage the conductive portion in the first position of the switch and the non-conductive portion in the second position of the switch.

11. The battery pack of claim 9, wherein the battery pack is configured to electrically and mechanically connect to a power tool.

12. The battery pack of claim 11, wherein the interface interacts with the power tool upon mechanical connection such that the switch moves from the second position to the first position.

13. The battery pack of claim 9, wherein the first battery cell is included in a first subcore and the second battery cell is included in a second subcore.

14. The battery pack of claim 9, wherein the second terminal includes an upper foot and a lower foot, wherein the upper foot of the first terminal is biased toward the lower foot of the first terminal, and wherein the upper foot of the second terminal is biased toward the lower foot of the second terminal.

15. The battery pack of claim 14, wherein the upper foot of the first terminal and the lower foot of the first terminal are configured to engage the conductive portion in the first position of the switch and the non-conductive portion in the second position of the switch.

16. The battery pack of claim 9, wherein the first and second terminals each include a first terminal portion connected to a second terminal portion.

* * * * *